US012422088B2

(12) United States Patent
Choi et al.

(10) Patent No.: US 12,422,088 B2
(45) Date of Patent: Sep. 23, 2025

(54) CARRIER MOUNTING SYSTEMS

(71) Applicant: ASPEN FRONTIERS, LLC, Boulder, CO (US)

(72) Inventors: Steven B. Choi, Lafayette, CO (US); William Nowakowski, Superior, CO (US)

(73) Assignee: ASPEN FRONTIERS, LLC, Boulder, CO (US)

( * ) Notice: Subject to any disclaimer, the term of this patent is extended or adjusted under 35 U.S.C. 154(b) by 159 days.

(21) Appl. No.: 17/989,617

(22) Filed: Nov. 17, 2022

(65) Prior Publication Data

US 2023/0151925 A1    May 18, 2023

Related U.S. Application Data

(60) Provisional application No. 63/280,574, filed on Nov. 17, 2021.

(51) Int. Cl.
*F16M 13/02* (2006.01)
*B60R 7/08* (2006.01)

(52) U.S. Cl.
CPC .............. *F16M 13/02* (2013.01); *B60R 7/08* (2013.01)

(58) Field of Classification Search
CPC ................... F16M 13/02; B60R 7/08
USPC ............................................ 224/547
See application file for complete search history.

(56) References Cited

U.S. PATENT DOCUMENTS

| 3,291,266 | A | * | 12/1966 | Komroff | ................ | A45C 3/004 |
| | | | | | | 190/115 |
| D566,964 | S | * | 4/2008 | Greiner | .......................... | D3/293 |
| 7,559,423 | B2 | * | 7/2009 | Vosloo | ................... | A45C 11/00 |
| | | | | | | 206/315.1 |
| 7,728,721 | B2 | | 6/2010 | Schofield et al. | | |
| 7,845,528 | B2 | | 12/2010 | McMillan | | |
| 8,578,647 | B2 | | 11/2013 | Storch et al. | | |
| 9,004,760 | B2 | | 4/2015 | Tzortzis | | |
| 9,944,217 | B2 | | 4/2018 | Schroeder et al. | | |
| 10,034,536 | B1 | | 7/2018 | Hilliard et al. | | |
| 10,307,313 | B2 | | 6/2019 | Schroeder et al. | | |
| 2002/0074199 | A1 | * | 6/2002 | Albritton | ............. | A45C 7/0095 |
| | | | | | | 190/110 |
| 2005/0241728 | A1 | * | 11/2005 | Nyhof | ....................... | B65B 1/04 |
| | | | | | | 141/313 |
| 2009/0052808 | A1 | * | 2/2009 | Pham | ................ | B65D 33/2508 |
| | | | | | | 383/23 |
| 2015/0089779 | A1 | | 4/2015 | Lawrence et al. | | |
| 2017/0202326 | A1 | | 7/2017 | Rieser | | |
| 2018/0194268 | A1 | | 7/2018 | Schroeder et al. | | |

FOREIGN PATENT DOCUMENTS

| CN | 103239027 A | 8/2013 |
| DE | 202010013051 U1 | 4/2011 |
| ES | 2763977 T3 | 6/2020 |
| GB | 2206484 A | 6/1988 |
| JP | 3178610 U | 9/2012 |

OTHER PUBLICATIONS https://www.campovans.com/collections/bags/products/large-hanging-bag, Nov. 7, 2022.

* cited by examiner

*Primary Examiner* — Peter N Helvey

(74) *Attorney, Agent, or Firm* — Van Court & Aldridge LLP

(57) ABSTRACT

Carrier mounting systems and methods for using the same are provided.

20 Claims, 25 Drawing Sheets

US 12,422,088 B2

CARRIER MOUNTING SYSTEMS

CROSS-REFERENCE TO RELATED APPLICATION(S)

This application claims the benefit of prior filed U.S. Provisional Patent Application No. 63/280,574, filed Nov. 17, 2021, which is hereby incorporated by reference herein in its entirety.

COPYRIGHT NOTICE

At least a portion of the disclosure of this patent document contains material that may be subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to carrier mounting systems and, more particularly, to mounting systems in vehicles for soft-sided carriers.

BACKGROUND OF THE DISCLOSURE

Cabinetry in a vehicle is often too large, hard, heavy, and/or permanently installed, thereby reducing the utility of the vehicle and/or of the cabinetry itself.

SUMMARY OF THE DISCLOSURE

This document describes carrier mounting systems and methods for using the same.

For example, a system for mounting a carrier to an environment component of an environment may be provided that may include a carrier mounting subsystem including a carrier mount mechanism and a carrier coupling mechanism for coupling the carrier mount mechanism to the carrier, and an environment mounting subsystem including an environment mount mechanism and an environment coupling mechanism for coupling the environment mount mechanism to the environment component, wherein the carrier mounting subsystem may define a plurality of loops at least when the carrier mount mechanism is coupled to the carrier, wherein the environment mount mechanism may include a body and a plurality of fingers extending from the body, wherein a first finger of the plurality of fingers may extend from a first side portion of a first side of the body to a first finger tip, wherein a second finger of the plurality of fingers may extend from a second side portion of a second side of the body to a second finger tip, wherein the first side of the body and the second side of the body may be different sides of the body, and wherein the carrier may be operative to be coupled to the environment mount mechanism by inserting the first finger into a first loop of the plurality of loops and then by inserting the second finger into a second loop of the plurality of loops while the first finger remains in the first loop.

As another example, a system for mounting a carrier to an environment component of an environment may be provided that may include a carrier mounting subsystem including a carrier mount mechanism and a carrier coupling mechanism for coupling the carrier mount mechanism to the carrier, and an environment mounting subsystem including an environment mount mechanism and an environment coupling mechanism for coupling the environment mount mechanism to the environment component, wherein the carrier mounting subsystem may define a plurality of loops at least when the carrier mount mechanism is coupled to the carrier, the environment mount mechanism may include a body and a plurality of fingers extending from the body, and the carrier may be operative to be coupled to the environment mount mechanism by inserting a first finger of the plurality of fingers into a first loop of the plurality of loops and by inserting a second finger of the plurality of fingers into a second loop of the plurality of loops.

As yet another example, a system may be provided for mounting a carrier including a plurality of loops to an environment component of an environment, where the system may include an environment mount mechanism and an environment coupling mechanism for coupling the environment mount mechanism to the environment component, wherein the environment mount mechanism may include a body and a plurality of fingers extending from the body, wherein a first finger of the plurality of fingers may extend from a first side portion of a first side of the body to a first finger tip, wherein a second finger of the plurality of fingers may extend from a second side portion of a second side of the body to a second finger tip, wherein the first side of the body and the second side of the body may be different sides of the body, the carrier may be operative to be coupled to the environment mount mechanism by positioning the first finger in a first loop of the plurality of loops and positioning the second finger in a second loop of the plurality of loops, and wherein a distance between the first loop and the second loop may be at least one of greater than a distance between the first side portion of the body and the second finger tip or less than a distance between the second side portion of the body and the first finger tip.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION OF THE DISCLOSURE

Figure 1:
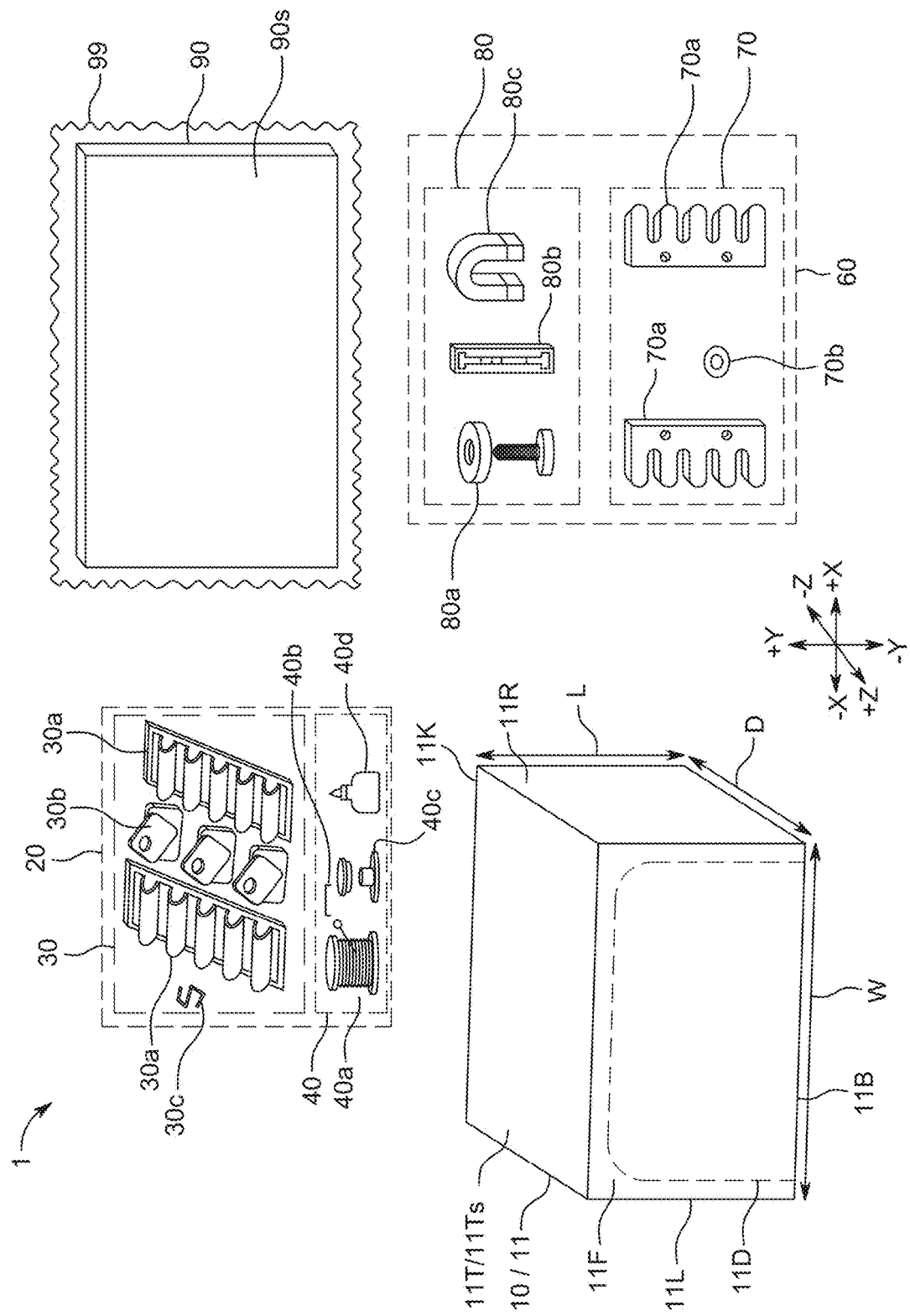
FIG. 1 is a perspective view of a carrier mounting system for coupling a carrier to an environment, according to some embodiments.
Figure 2:
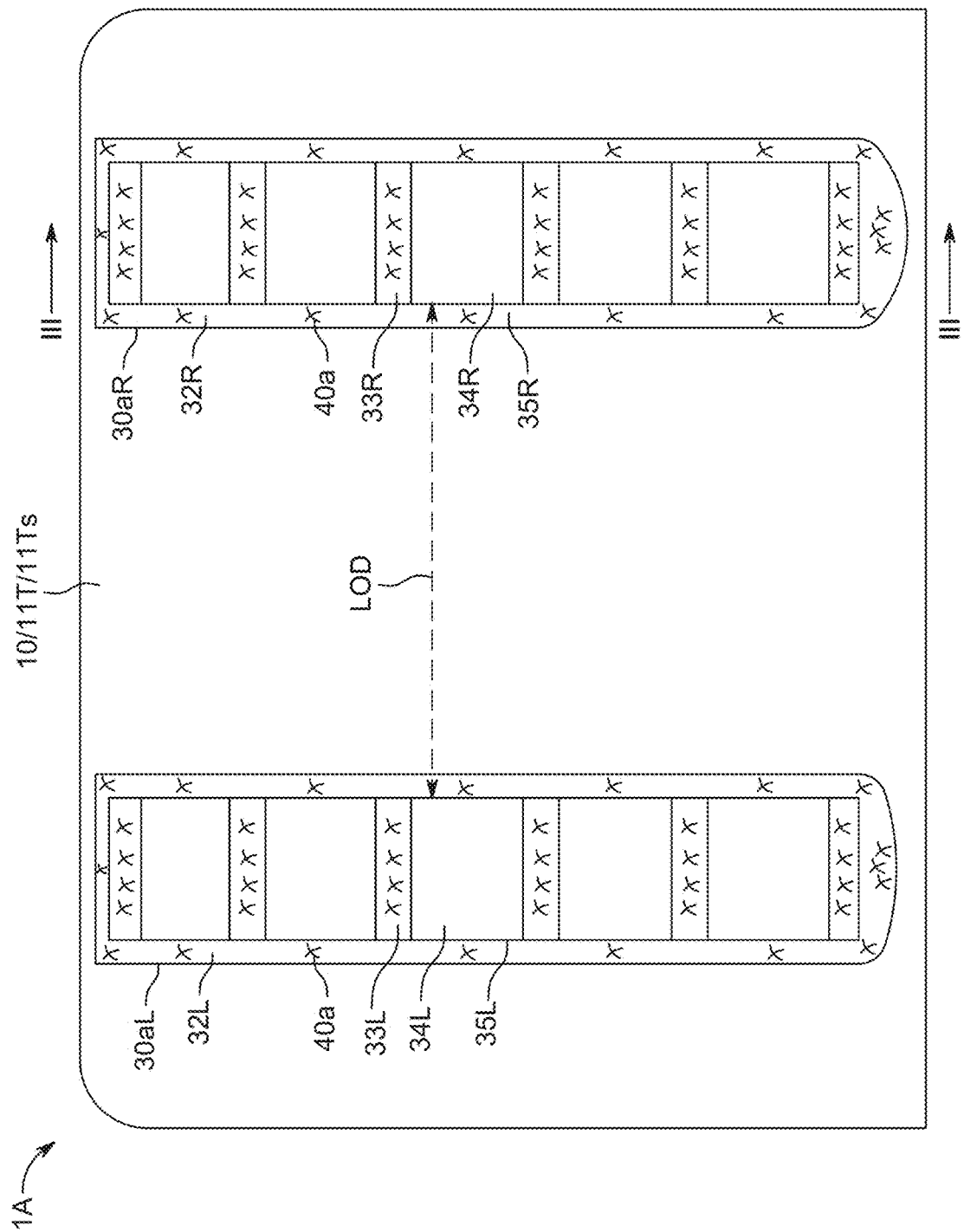
FIG. 2 is a top view of a portion of a carrier mounting system, according to some embodiments.
Figure 3:
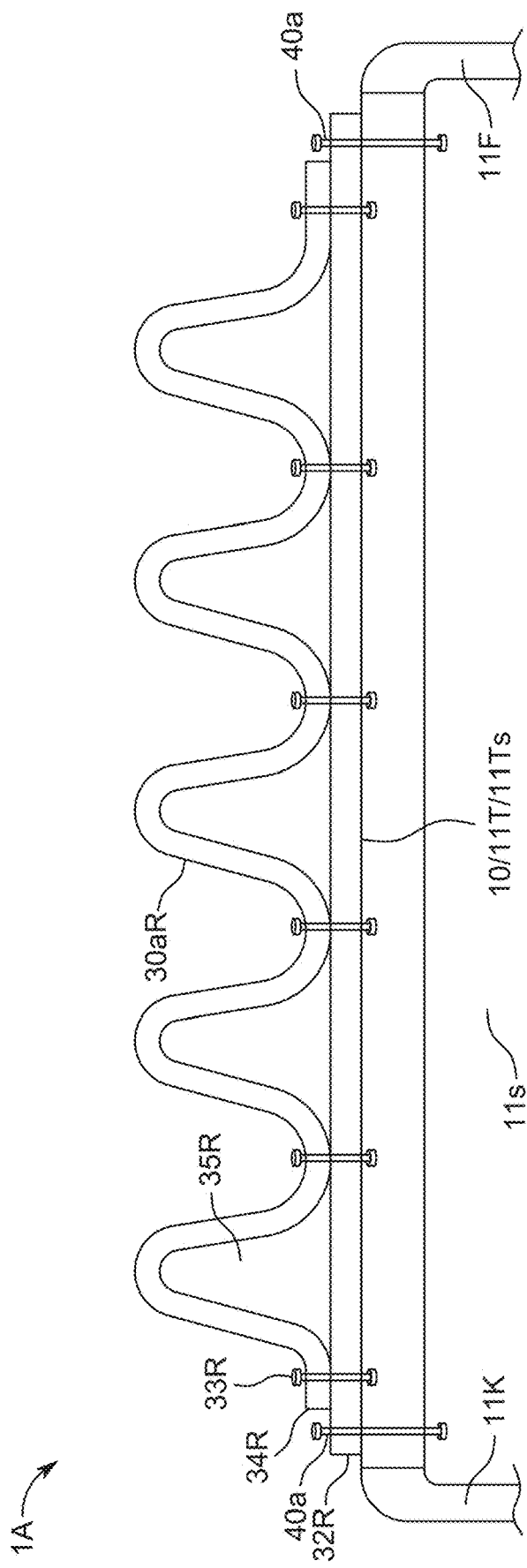
FIG. 3 is a cross-sectional view of a portion of the carrier mounting system of FIG. 2, taken from line III-III of FIG. 2, according to some embodiments.
Figure 4:
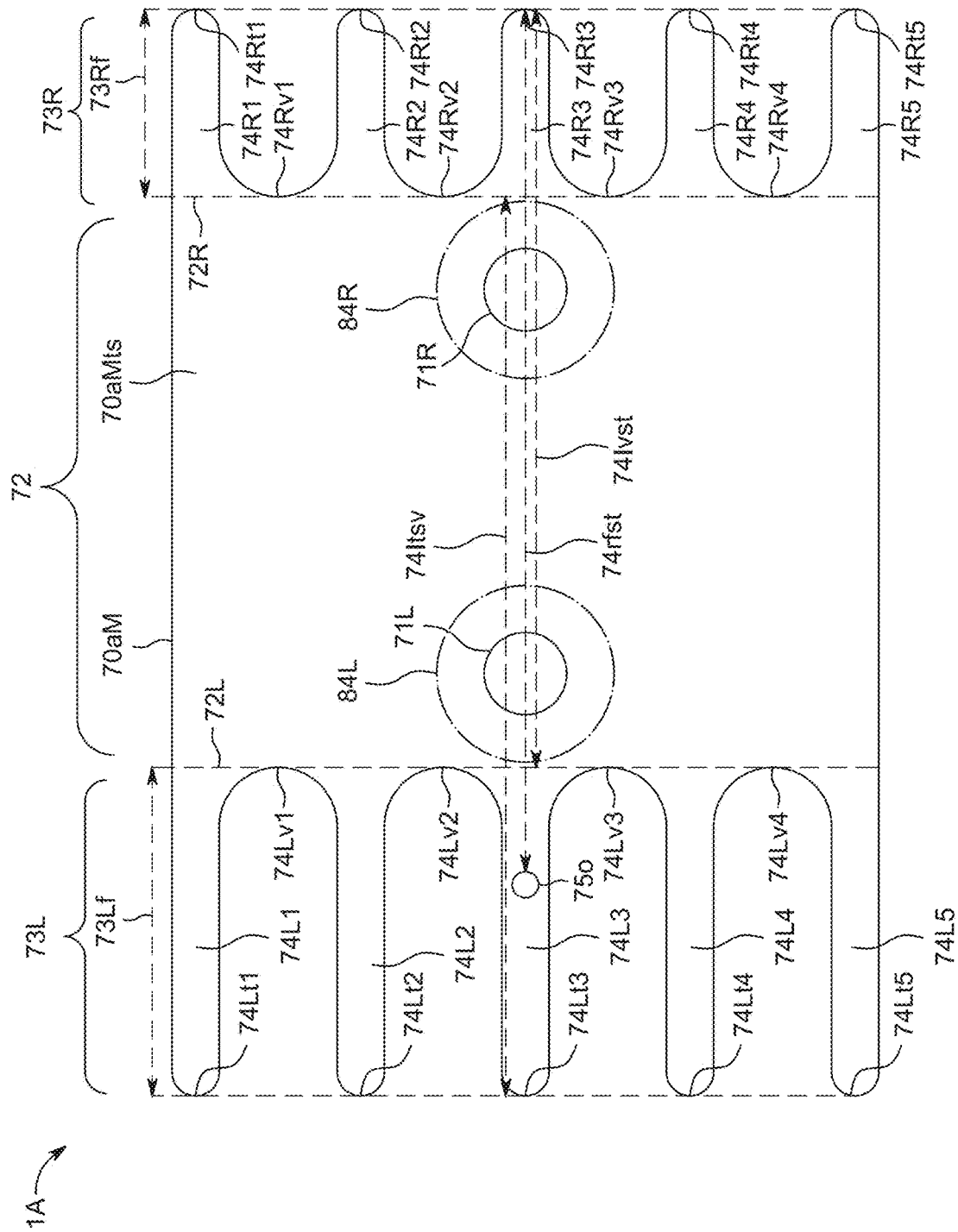
FIG. 4 is a top view of a portion of the carrier mounting system of FIGS. 2 and 3, according to some embodiments.
Figure 5:
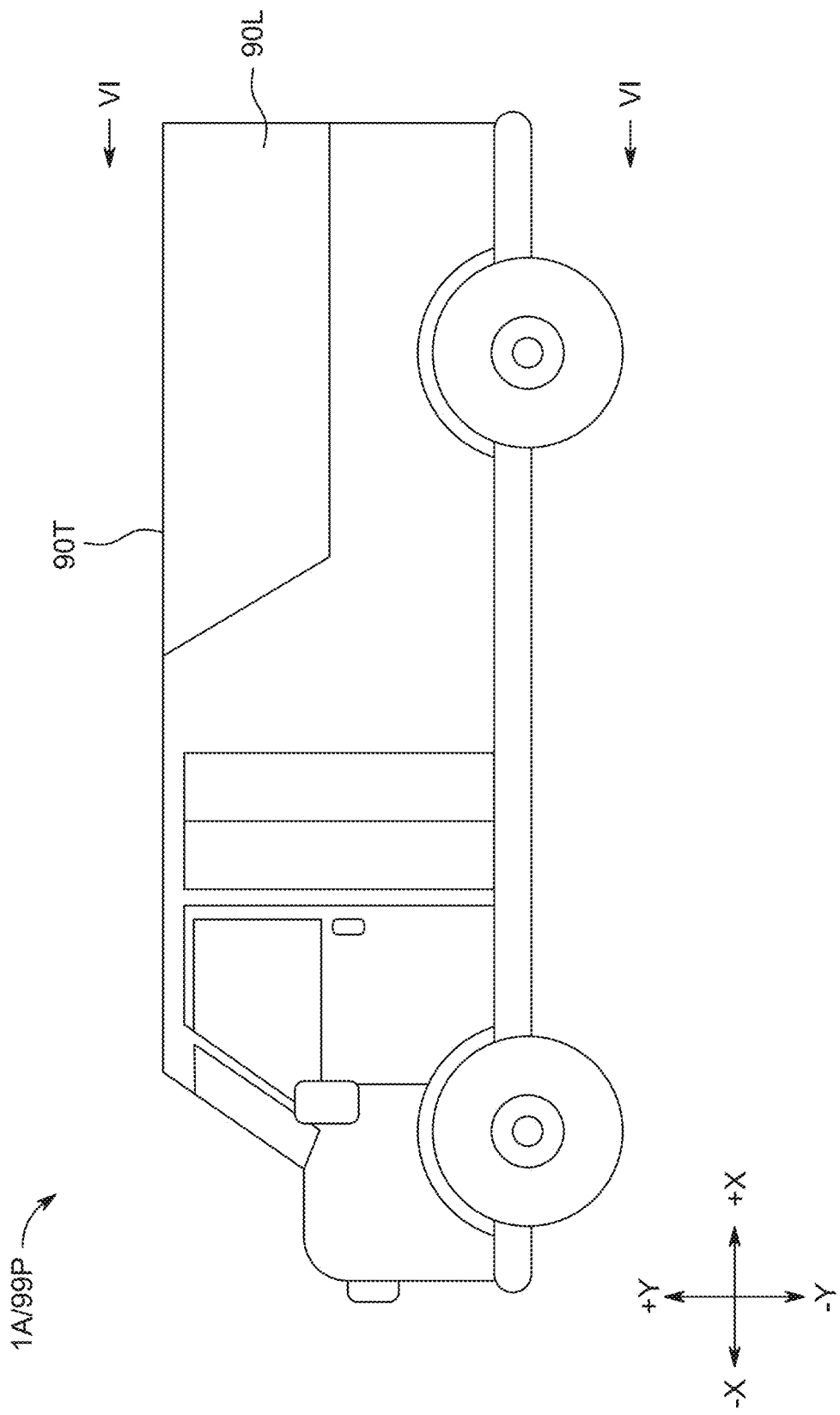
FIG. 5 is a side view of an environment to be coupled to a carrier using a carrier mounting system of FIGS. 2-4 view of a portion of a carrier mounting system, according to some embodiments.

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. The terms "includes," "including," "comprises," and/or "comprising," when used in this specification, may specify the presence of stated features, integers, steps, operations, elements, and/or components, but do not preclude the presence or addition of one or more other features, integers, steps, operations, elements, components, and/or groups thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

Carrier mounting systems and methods for using the same may be provided. A carrier mounting system may include a system for coupling and decoupling any suitable carrier from any suitable surface of any suitable environment component of any suitable environment in which a user may want to store and use the carrier (e.g., temporarily). The system may include a carrier mounting subsystem that may be coupled to the carrier and an environment mounting subsystem that may be coupled to the environment component, while the carrier mounting subsystem may be selectively coupled to or decoupled from the environment mounting subsystem by an end user for enabling the carrier to be temporarily mounted to the environment component. As opposed to cabinetry being installed permanently or directly to a component of an environment, such as a vehicle, enabling any suitable carrier (e.g., luggage) to be easily coupled to and decoupled from a mounting plate that may be coupled to a component of the environment by an end user may provide user flexibility for use of not only the carrier but also the environment. The system may be configured to work with one or more characteristics of any suitable carrier (e.g., one or more characteristics of an environment mounting subsystem (e.g., size, shape, number of fingers, length of fingers, etc.) may be configured to work with a carrier mounting subsystem that may be particularly configured for a particular carrier or integrated into a particular carrier (e.g., manufactured into the carrier before being made available to an end user (e.g., a 40 L Patagonia Black Hole Duffel))). Instead of mounting multiple sides of hard sided cabinets or mule bags onto multiple respective walls of a vehicle (e.g., interior vehicle ceiling and interior vehicle side wall), the carrier mounting systems of the disclosure may allow for easy installation of an environment mounting subsystem with only one coupling point or just two coupling points (e.g., easy install with two bolts) on a single wall of the vehicle, which may provide fewer rattles. Using soft sided carriers may provide less hard edges that may be hazardous to users and the easy coupling and decoupling of a carrier to and from the environment mounting subsystem may enable the carrier to be easily cleaned and used beyond the confines of the vehicle environment.

Figure 14:
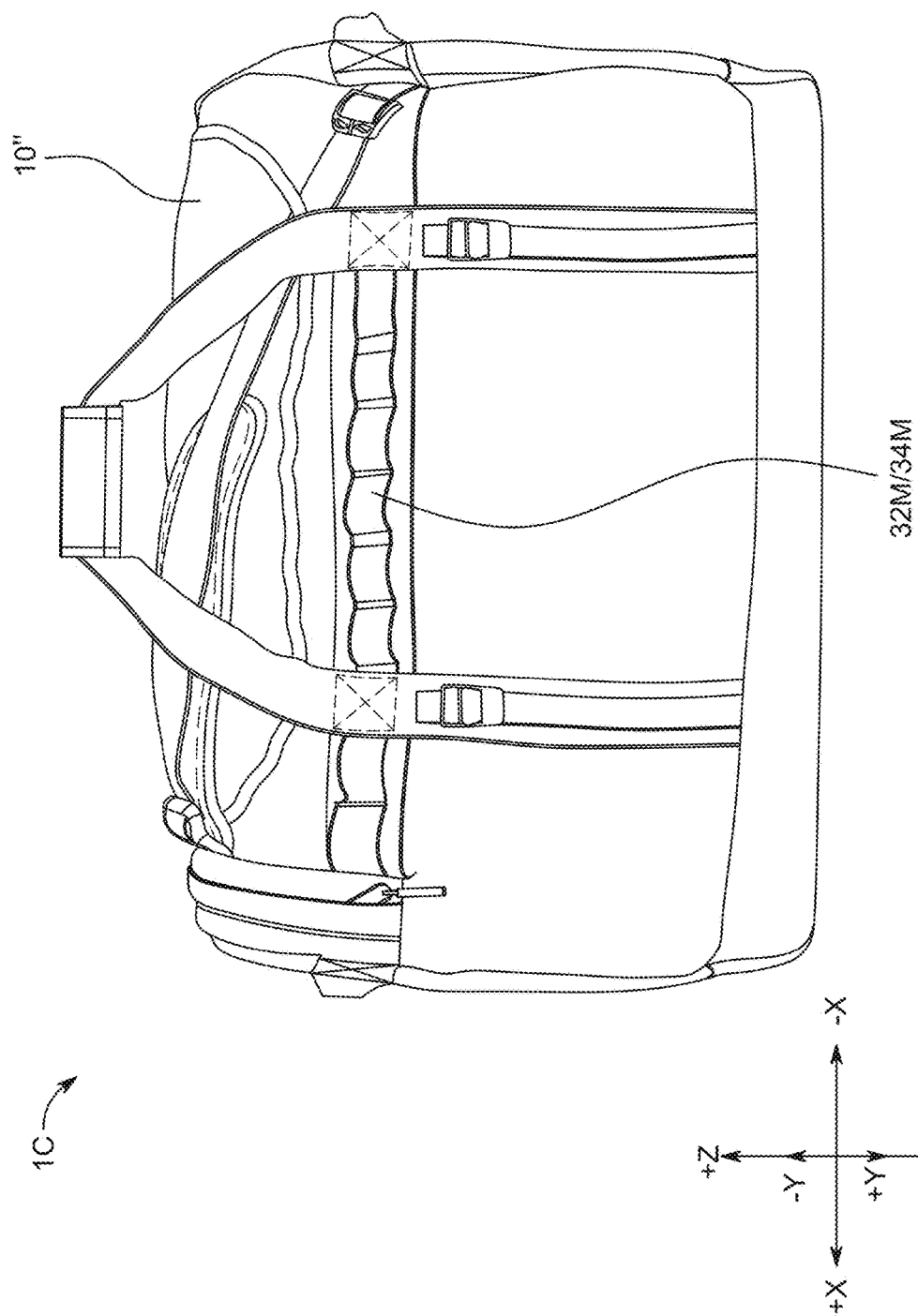
FIG. 14 is a perspective view of a carrier with an optional portion of a carrier mounting system, according to some embodiments.

As shown in FIG. 1, a carrier mounting system 1 may be provided for coupling a carrier 10 to an environment component 90. For example, as shown in FIGS. 1-3 and 8-11, carrier 10 may be any suitable apparatus that may include a housing 11 defining at least one internal space 11s that may be configured to at least partially hold, protect, and/or carry any suitable cargo C. Housing 11 may be any suitable shape and may include any suitable number of walls. In some embodiments, as shown in FIG. 1, for example, housing 11 may be of a generally hexahedral shape and may include a bottom wall 11B, a top wall 11T that may be opposite bottom wall 11B, a left wall 11L, a right wall 11R that may be opposite left wall 11L, a front wall 11F, and a back wall 11K that may be opposite front wall 11F. As shown, for example, a size of carrier 10 may be defined along the X-axis by an overall housing width W of housing 11 that may extend between left surface 11L and right surface 11R, along the Y-axis by an overall housing length L of housing 11 that may extend between top surface 11T and bottom surface 11B, and along the Z-axis by an overall housing depth D of housing 11 that may extend between front surface 11F and back surface 11K. Internal space 11s may be accessed in any suitable manner, such as by opening a door 11D (e.g., as may be defined by a zipper) to provide an opening 11o through front wall 11F for exposing space 11s (see, e.g., FIG. 11). Although surfaces (e.g., exterior surfaces, such as exterior surface 11Ts) of various walls of housing 11 may be shown as substantially rectangular and flat, it is to be understood that any wall or surface or edge or corner may be any suitable shape (e.g., may be defined by a curved or other non-polygonal (e.g., circular) shape), and/or any two walls may meet at any suitable angle and/or form an edge of any suitable shape or curvature. Carrier 10 may be any suitable apparatus, including, but not limited to, a soft-sided carrier, duffel bag, mule bag, luggage, backpack, hard-sided carrier, and/or the like, and housing 11 may be made of any suitable material and/or combination of materials, including, but not limited to, polyester (e.g., polyester ripstop with a TPU-film laminate), plastic, rubber, textile fabric, and/or the like. One or some walls may be soft-sided while one or more other walls may be hard-sided. Although not shown, carrier 10 may include any suitable handles, straps (e.g., shoulder straps), pockets, padding, wheels, rollers, and/or any other suitable features (see, e.g., carrier 10' of FIG. 12 and/or carrier 10" of FIG. 14).

Environment component 90 may be any suitable component of any suitable environment 99 in which carrier 10 may be used. For example, environment 99 may include, but is not limited to, a closet, a showroom, a store, a vessel, a vehicle (e.g., truck, watercraft (e.g., boat), airplane, helicopter, multi-purpose vehicles (e.g., Mercedes Sprinter, Ram Promaster, Ford Transit van models), full-size van, minivan, truck with a topper, SUV, overloading rig, jeep, all-terrain vehicle, 4-wheeler, general off roading rig, expedition vehicle, military vehicle, golf cart, electric vehicle, trailer, towable cargo carrier, autonomous vehicle (e.g., drone), coupe, topper/shell for pickup/coupe, tonneau cover for pickup truck, etc.), and/or the like. Component 90 may be any suitable component of any such environment to which a carrier may be selectively mounted, including, but not limited to, a shelf of a closet, a wall or ceiling or floor of a showroom or store or vehicle, and/or the like.

System 1 may include any suitable carrier mounting subsystem 20 that may be coupled to carrier 10 and any suitable environment mounting subsystem 60 that may be coupled to environment component 90, while carrier mounting subsystem 20 may be selectively coupled to or decoupled from environment mounting subsystem 60 by an end user for enabling carrier 10 to be temporarily mounted to environment component 90.

Carrier mounting subsystem 20 may include any suitable carrier mount mechanism(s) 30, each of which may be coupled to any suitable surface(s) of any suitable component(s) of carrier 10 by any suitable carrier coupling mechanism(s) 40. For example, carrier mount mechanism 30 may be any suitable mechanism or mechanisms configured to interact with and be coupled to a respective mechanism of environment mounting subsystem 60, including, but not limited to, one or more daisy chain straps 30a or gear loops that may define any suitable number of loops (e.g., plastic, metal, webbing, etc.), one or more holed patches 30b, one or more clips 30c (e.g., S-clips, etc.), and/or any other suitable type of carrier mount mechanism that may define one or more slots or access points or loops or passageways that may be configured to receive a respective component of an environment mounting subsystem 60 (e.g., when coupling a mechanism 30 of subsystem 20 to a mechanism 70 of a subsystem 60). Additionally, carrier coupling mechanism 40 may include any suitable mechanism(s) for coupling any suitable carrier mount mechanism 30 to any suitable portion of carrier 10 (e.g., to exterior surface 11Ts of top wall 11T of housing 11), including, but not limited to, any suitable thread 40a that may be used to sew or stitch (e.g., bar tack) any suitable mechanism 30 to carrier 10 (e.g., to fasten strap 30a or patch 30b to an exterior surface of a wall of carrier housing 11), any suitable staple(s) 40b that may be used to hold any suitable mechanism 30 to carrier 10 (e.g., to fasten strap 30a or patch 30b to an exterior surface of a wall of carrier housing 11), any suitable glue or adhesive 40d that may be used to hold any suitable mechanism 30 to carrier 10 (e.g., to hold strap 30a or patch 30b to an exterior surface of a wall of carrier housing 11), any suitable grommet(s) 40c that may be used to enable any suitable mechanism 30 to be received and held by carrier 10 (e.g., to receive portion(s) of clip 30c through a wall of carrier housing 11 or any other suitable feature of carrier 10), and/or the like. In some embodiments, carrier mounting subsystem 20 may be fully integrated into carrier 10 (e.g., by a manufacturer of carrier 10). Alternatively, one or more carrier mounting subsystems 20 may be made available to an end user of carrier 10 or to an intermediary for properly coupling one or more suitable carrier mounting subsystems 20 to carrier 10 for use with any suitable environment mounting subsystems 60 (e.g., one or more carrier mounting subsystems 20 may be packaged and/or sold in conjunction with one or more environment mounting subsystems 60 for eventual use by an end user with any suitable carrier 10 and any suitable environment component 90).

Environment mounting subsystem 60 may include any suitable environment mount mechanism(s) 70, each of which may be coupled to any suitable surface(s) of any suitable component(s) 90 of environment 99 by any suitable environment coupling mechanism(s) 80. For example, environment mount mechanism 70 may be any suitable mechanism or mechanisms configured to interact with and be coupled to a respective mechanism of carrier mounting subsystem 20, including, but not limited to, one or more mounting plates 70a that may define any suitable number of fingers (e.g., extended features each with a free end), one or more rings or holed devices 70b (e.g., carabiner clip, metal ring, etc.), and/or any other suitable type of environment mount mechanism that may define one or more physical structures that may be configured to be received by or otherwise interlock with or couple to a respective component of a carrier mounting subsystem 20 (e.g., when coupling a mechanism 70 of subsystem 60 to a mechanism 30 of a subsystem 20). Additionally, environment coupling mechanism 80 may include any suitable mechanism(s) for coupling any suitable environment mount mechanism 70 to any suitable portion of environment 99 (e.g., to a surface 90s of a component 90 (e.g., wall) in/of environment 99), including, but not limited to, any suitable nut, bolt/screw/stud, and/or washer fastener assembly 80a that may be used to fasten any suitable mechanism 70 to environment component 90 (e.g., to fasten a mounting plate 70a to environment component 90 (e.g., via a passageway through plate 70a and into a threaded hole made through surface 90s into component 90), any suitable track or framing mechanism 80b that may be attached to environment component 90 (e.g., via additional coupling mechanism 80a) and then used to fasten any suitable mechanism 70 to that mechanism 80b (e.g., framing mechanism 80b may be any suitable E-track, L-track, 80/20 framing, T-slot structural framing, V-slot rails, and/or the like that may be coupled along any suitable portion of environment component 90 and may enable a coupling component (e.g., T-slot nut) to be positioned and held anywhere along the track/slot/rail/frame of mechanism 80b, which may be used to couple to an environment mount mechanism 70, such that environment mount mechanism 70 may be selectively coupled to one or many possible positions along the track/slot/rail/frame of mechanism 80b), any suitable glue or adhesive or magnet(s) 80c that may be used to hold any suitable mechanism 70 to environment component 90 (e.g., to hold plate 70a or device 70b to an exterior surface 90s of component 90), and/or the like. In some embodiments, at least a portion or all of some types of environment coupling mechanism 80 may be fully integrated into environment component 90 (e.g., by a manufacturer of environment component 90 (e.g., one or more framing mechanisms 80b along any suitable paths along any suitable surfaces of a vehicle or closet or otherwise)). Alternatively, one or more environment coupling mechanisms 80 may be made available to an end user of environment component 90 or to an intermediary for properly coupling one or more suitable environment mounting subsystems 60 to environment component 90 for use with any suitable carrier mounting subsystems 20 (e.g., one or more environment mounting subsystems 60 may be packaged and/or sold in conjunction with one or more carrier mounting subsystems 20 for eventual use by an end user with any suitable carrier 10 and any suitable environment component 90).

Any suitable carrier mounting subsystem may be coupled to any suitable portion(s) of any suitable carrier. For example, as shown in a system 1A of FIGS. 2-11, a first or left carrier mounting subsystem 20 may include a left daisy chain strap carrier mount mechanism 30aL coupled to a left portion of top wall 11T along top surface 11Ts of cover 11 of carrier 10 by thread carrier coupling mechanism 40a (e.g., left daisy chain strap carrier mount mechanism 30aL may include a daisy chain webbing strap 34L that may be coupled to (e.g., bar tacked to) a base webbing strap 32L at any suitable intervals via any suitable couplings 33L (e.g., bar tacked stitching) for generating any suitable number of (e.g., 5) access points or loops 35L between straps 32L and 34L, while base webbing strap 32L of left daisy chain strap carrier mount mechanism 30aL may be coupled to (e.g., bar tacked or otherwise sewn to) top wall 11T via any suitable thread carrier coupling mechanisms 40a (e.g., all the way through or at least partially through wall 11T via top surface 11Ts)), while a second or right carrier mounting subsystem 20 may include a right daisy chain strap carrier mount mechanism 30aR coupled to a right portion of top wall 11T along top surface 11Ts of cover 11 of carrier 10 by a thread carrier coupling mechanism 40a (e.g., right daisy chain strap carrier mount mechanism 30aR may include a daisy chain webbing strap 34R that may be coupled to (e.g., bar tacked to) a base webbing strap 32R at any suitable intervals via any suitable couplings 33R (e.g., bar tacked stitching) for generating any suitable number of (e.g., 5) access points or loops 35R between straps 32R and 34R, while base webbing strap 32R of right daisy chain strap carrier mount mechanism 30aR may be coupled to (e.g., bar tacked or otherwise sewn to) top wall 11T via any suitable thread carrier coupling mechanisms 40a (e.g., all the way through or at least partially through wall 11T via top surface 11Ts)). It is to be understood that any suitable carrier mount mechanism(s) and carrier coupling mechanism(s) may be provided but ought to be configured to be strong enough to withstand the pressures and stresses that may occur during their use within system 1A (e.g., suspending carrier 10 in the air (e.g., hanging down from the bottom surface of a horizontally extending component 90) with any suitable carrier cargo C held therein). As shown, when coupled to top wall 11T of carrier 10, an opposing loop opening distance LOD may extend between the opening of a loop 35L of left daisy chain strap carrier mount mechanism 30aL and the opposing opening of a loop 35R of right daisy chain strap carrier mount mechanism 30aR, where such a distance may be the same between any two opposing loops 35L and 35R of system 1A (e.g., base straps 32L and 32R (and/or daisy chain straps 34L and 34R) may extend parallel to one another along surface 11Ts of wall 11T of carrier 10). Such a distance LOD may be the maximum distance between two opposing loops 35L and 35R (e.g., when the portion of top wall 11T therebetween is taught (e.g., if that wall is soft-sided and deformable)) or the distance when the system is in its natural state. However, it is to be understood that other systems may be provided where the distance between opposing loops of two carrier mounting subsystems may vary (see, e.g., system 1B of FIGS. 12 and 13 (e.g., where a distance LOD' between opposing loops may vary as base straps 32L and 32R (and/or daisy chain straps 34L and 34R) may extend at some angle θ with respect to one another along surface 11Ts of wall 11T of a carrier 10')), and even other systems may be provided without any opposing loops (see, e.g., system 1C of FIG. 14 (e.g., where a single base strap 32M and single daisy chain strap 34M may extend along a surface of a wall of a carrier 10" for use with one or more fingers that do not oppose each other)). In some embodiments, a daisy chain strap carrier mount mechanism may not include a base webbing strap, but may include a daisy chain webbing strap that may be directly coupled to a portion of a carrier for forming one or more loops (e.g., with any suitable carrier coupling mechanism(s), which may be similar to couplings 33L/33R (e.g., bar tacked stitching) but that may extend through a portion of the daisy chain webbing strap and a portion of the carrier (e.g., a top wall), whereby a loop may be formed by a combination of the daisy chain webbing strap and the carrier).

Figure 7:
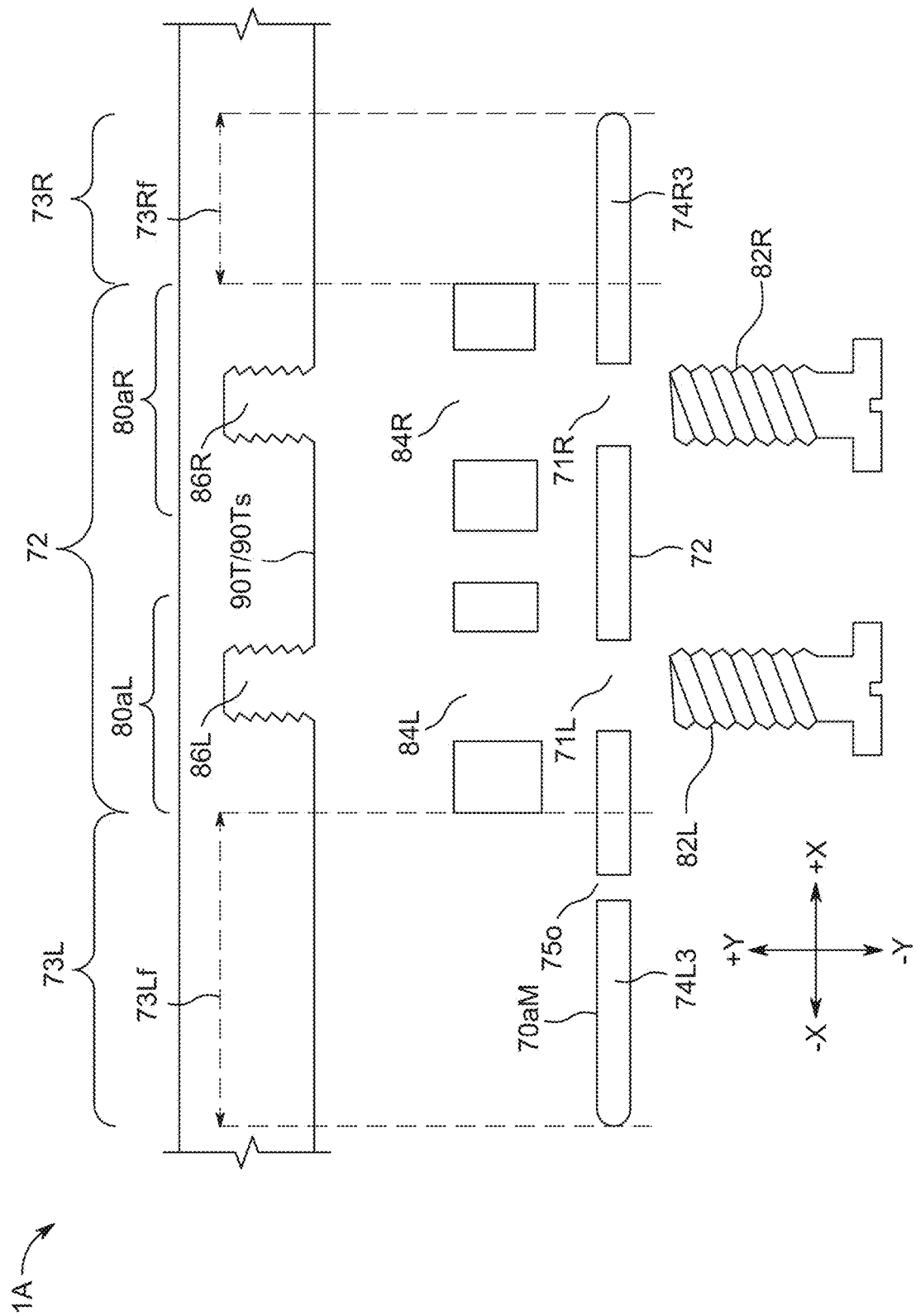
FIG. 7 is a cross-sectional view of the environment and the carrier mounting system of FIGS. 2-6, taken from line VII-VII of FIG. 6, in a first configuration, according to some embodiments.
Figure 8:
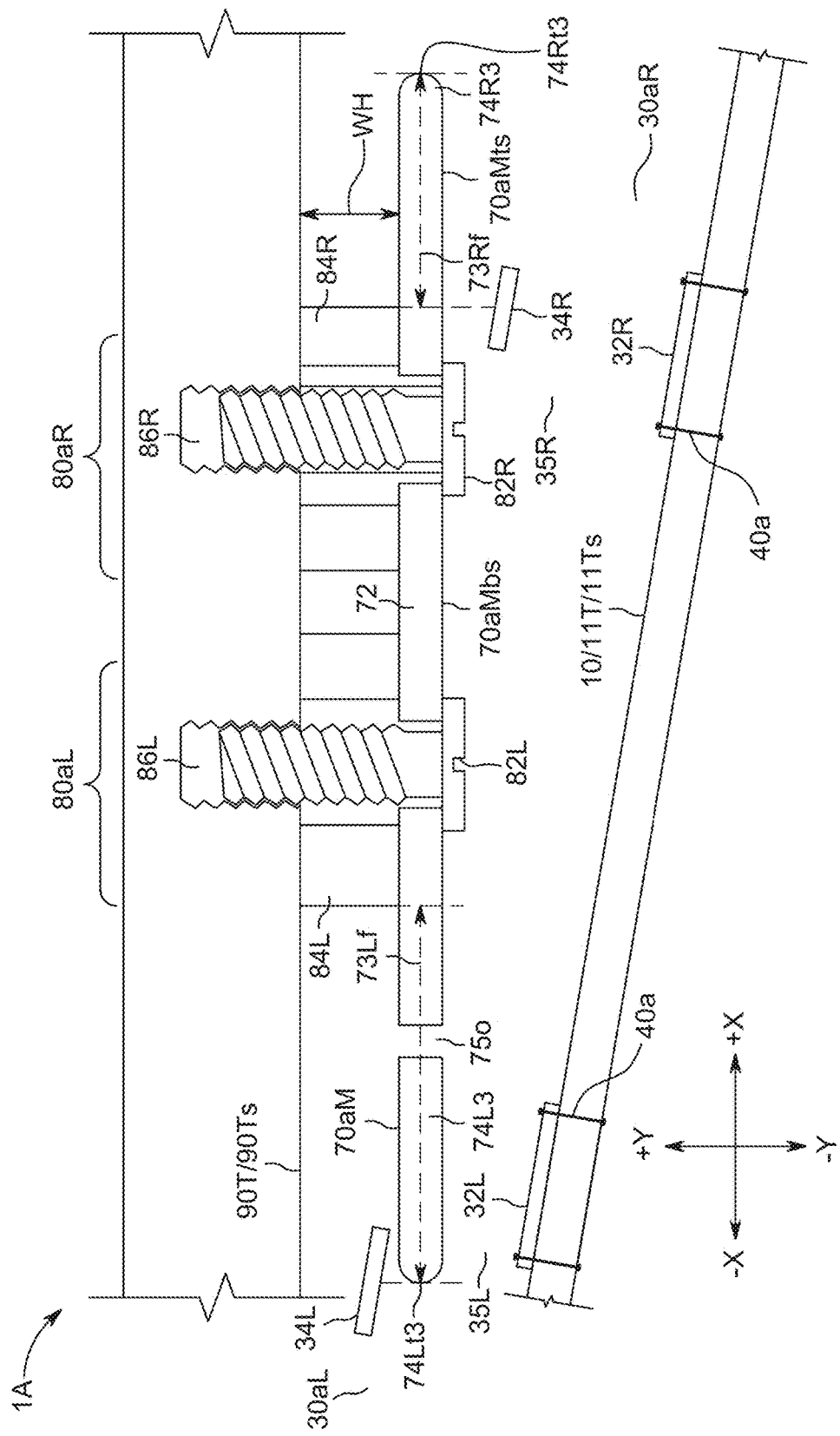
FIG. 8 is a cross-sectional view of the environment and the carrier mounting system of FIGS. 2-7, taken from line VII-VII of FIG. 6, in a second configuration, according to some embodiments.

Any suitable environment mounting subsystem may be coupled to any suitable portion(s) of any suitable component(s) of any suitable environment. For example, as shown in a system 1A of FIGS. 2-11, a mounting subsystem 60 may include a main mounting plate 70aM coupled to an exposed interior surface 90Ts of a top wall 90T of an environment 99 (e.g., an underside surface of a top wall of a topper of a pickup truck environment 99P by any suitable nut, bolt/screw/stud, and/or washer fastener assembly(ies) 80a (e.g., within enclosure space 90s that may be defined by any suitable walls/components of the topper and truck, although it may alternatively be mounted to an exterior surface thereof)). More particularly, as shown, to fasten mounting plate 70aM to top wall environment component 90T along its interior surface 90Ts, a bolt 82L of a first fastener assembly 80aL may be passed (e.g., in the +Y direction) via a first mounting passageway 71L through a body portion 72 (e.g., central body portion) of mounting plate 70aM and via a washer 84L of first assembly 80aL and then mated (e.g., twisted about the Y-axis) into a first threaded nut or hole 86L made through surface 90Ts into component 90T, while a bolt 82R of a second fastener assembly 80aR may be passed (e.g., in the +Y direction) via a second mounting passageway 71R through central body portion 72 of mounting plate 70aM and via a washer 84R of second assembly 80aR and then mated (e.g., twisted about the Y-axis) into a second threaded nut or hole 86R made through surface 90Ts into component 90T (see, e.g., the coupling from FIG. 7 to FIG. 8). In other embodiments, a bolt or stud may extend from the environment component and a threaded nut or hole may be provided in the mounting plate or such a nut may be used with a tip of the stud after passing through the mounting plate. While such a subsystem 60 may utilize two environment coupling mechanism fastener assemblies 80 (e.g., via two mounting passageways 71 through plate 70aM), it is to be understood that only one such fastener assembly or more than two such assemblies may be used depending on the needs of the system (e.g., depending on the size, shape, and/or weight of one or more of the components). Therefore, in some embodiments, only one passageway 71 may be provided through a mounting plate if the size and/or expected wait may allow for a single coupling, while other embodiments may have three or more. Moreover, while such environment coupling mechanism fastener assemblies 80 may couple subsystem 60 to a particular portion of component 90, it is to be understood that other environment coupling mechanisms (e.g., track or framing mechanism 80b) may enable some selective movement that may enable movement of subsystem 60 (e.g., plate 70aM) along such a track to one of various suitable positions along surface 90Ts of component 90. As shown in FIG. 8, washers 84L and 84R may ensure at least a working space distance WH between component surface 90Ts and the opposing top surface 70aMts of mounting plate 70aM once fully coupled to component 90T via environment coupling mechanism fastener assembly(ies) 80, where such a distance WH may enable certain functionalities of system 1A (e.g., coupling of subsystem 60 to subsystem 20 and/or use of any suitable retention features).

Mounting plate 70aM may be any suitable plate or rack or bracket or body of any suitable material or combination of materials (e.g., metal, aluminum, polymer, wood (e.g., machined, molded, casted, etc.)) that may be configured to provide the performance that may be desired for a particular use case (e.g., to provide the strength necessary to support a carrier of a particular weight). Plate 70aM may have a top surface 70aMts and a bottom surface 70aMbs for defining a plate of any suitable thickness, which may be fixed or which may vary along any suitable dimension(s) (e.g., length and/or width) of the plate. A mounting plate may include at least one finger or extended featured that may be configured to pass through at least a portion of a loop of a carrier mount mechanism in order to help couple the mounting plate to the carrier mount mechanism (e.g., to help hold the mounting plate with respect to the carrier mount mechanism). For example, as shown, mounting plate 70aM may include a first set 73L of any suitable number of fingers (e.g., a set of five fingers 74L (e.g., fingers 74L1-74L5, any of which may be flat, curved (e.g., within the plane of FIG. 4), arched (e.g., out of the plane of FIG. 4), and/or any other suitable shape)), where each one of fingers 74L may extend from a left side (e.g., left side wall 72L) of central body portion 72 of mounting plate 70aM (e.g., left side wall 72L) to a finger free end or finger tip 74Lt (e.g., finger tips 74Lt1-74Lt5, any of which may be rounded or flat or any other suitable shape), and where a valley portion 74Lv is formed at a portion of plate 70aM between two adjacent fingers 74L (e.g., valleys 74Lv1-74Lv4, any of which may be rounded or flat or any other suitable shape), and mounting plate 70aM may additionally include a second set 73R of any suitable number of fingers (e.g., a set of five fingers 74R (e.g., fingers 74R1-74R5, any of which may be flat, curved (e.g., within the plane of FIG. 4), arched (e.g., out of the plane of FIG. 4), and/or any other suitable shape)), where each one of fingers 74R may extend from a right side of central body portion 72 of mounting plate 70aM (e.g., right side wall 72R that may be opposite left side wall 72L) to a finger free end or finger tip 74Rt (e.g., finger tips 74Rt1-74Rt5, any of which may be rounded or flat or any other suitable shape), and where a valley portion 74Rv is formed at a portion of plate 70aM between two adjacent fingers 74R (e.g., valleys 74Rv1-74Rv4, any of which may be rounded or flat or any other suitable shape). Therefore, when used with carrier mount mechanisms 30aL and 30aR, each with five loops 35, environment mount mechanism mounting plate 70aM may provide a different one of ten fingers 74 for interacting with a respective one of loops 35. However, in other embodiments, the mounting plate(s) may provide more fingers than there are loops, or less fingers than there are loops, and the carrier mount mechanism(s) and the environment mount mechanism(s) may still be operative to work together for selectively coupling/decoupling a carrier to an environment component (e.g., a single loop may interact with (e.g., extend about) two fingers rather than just one, or one loop may interact with one finger while another loop may not interact with any finger, or one finger may interact with one loop while another finger may not interact with ant loop, etc.). In some embodiments, fingers may not be opposing (e.g., may not extend in directly opposite directions from the plate body), but instead a mounting plate may include left fingers extending from the left edge of the body adjacent the front and back of the plate (e.g., fingers 74L1 and 74L5 but not fingers 74L2-74L4) and right fingers extending from the right edge of the body more towards the middle rather than adjacent the front and back (e.g., right fingers 74R2-74R4 but not fingers 74R1 and 74R5), whereby loops may or may not be provided on each side where there are not fingers.

Figure 6:
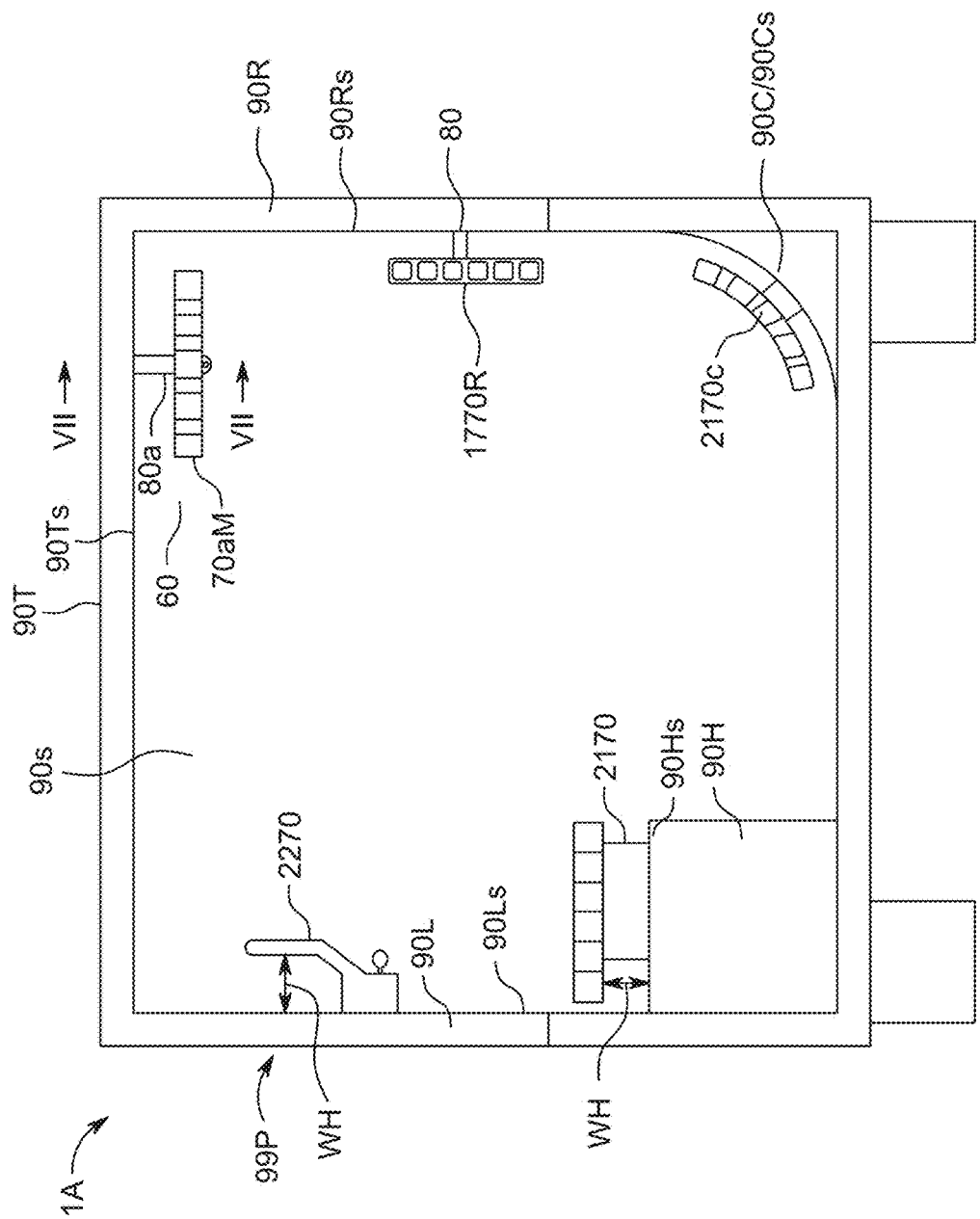
FIG. 6 is a cross-sectional view of a portion of the environment of FIG. 5 with the carrier mounting system of FIG. 4, taken from line VI-VI of FIG. 5, according to some embodiments.

In some embodiments, one or more relationships between fingers and/or valleys at opposing sides of a central body portion or otherwise may be defined to facilitate coupling/ decoupling of the carrier mount mechanism to the environment mount mechanism, and/or to facilitate retention of such a coupling. Continuing with the example of an environment mounting subsystem 60 including environment mount mechanism mounting plate 70aM and a carrier mounting subsystem 20 including carrier mount mechanism(s) 30aL and 30aR of FIGS. 2-4, one or more relationships between a set of opposing fingers 74 may be configured to interact with one or more relationships between a set of opposing loops 35 for facilitating a simple coupling process and/or a simple decoupling process. For example, as shown, each one of fingers 74L1-74L5 may extend a length 73Lf from a left edge of central body portion 72 (e.g., from its valley portion 74Lv) to the respective finger's finger tip 74Lt, such that each one of fingers 74L of finger first set 73L may be of the same length 73Lf, while, similarly, each one of fingers 74R1-74R5 may extend a length 73Rf from a right edge of central body portion 72 (e.g., from its valley portion 74Rv) to the respective finger's finger tip 74Rt, such that each one of fingers 74R of finger second set 73R may be of the same length 73Rf. However, in some embodiments, such a length 73Lf of each finger 74L of first set 73L may be different (e.g., longer) than such a length 73Rf of each finger 74R of second set 73R. When a finger 74L is longer than an opposing finger 74R by at least a certain amount, this relationship may facilitate an easy or simple coupling/decoupling of these fingers with their respective opposing loops. For example, a coupling process may be described with respect to FIGS. 8-11. Once plate 70aM has been coupled to surface 90Ts of environment component top wall 90T of truck environment 99P by environment coupling mechanism(s) 80 (e.g., with fastener assemblies 80aL and 80aR, as shown in FIGS. 6-8), and once carrier mount mechanism(s) 30aL and 30aR have been coupled to surface 11Ts of carrier component top wall 11T of carrier 10 by carrier coupling mechanism(s) 40 (e.g., with thread carrier coupling mechanism(s) 40a), carrier 10 may be moved into the position of FIG. 8, such that daisy chain webbing strap 34L of one, some, or each loop 35L of left daisy chain strap carrier mount mechanism 30aL may be aligned just above finger tip 74Lt of a finger 74L with which that loop is to interact for at least partially coupling mechanism 30aL to mount plate 70aM (e.g., such that the portion of daisy chain webbing strap 34L defining at least a portion of the middle loop 35L of left daisy chain strap carrier mount mechanism 30aL may be aligned just above finger tip 74Lt3 of finger 74L3 such that at least the tip of finger 74L3 may be received by that loop (e.g., within working space distance WH)). A curved surface or rounded surface(s) of the finger tip may allow for the loop to be aligned with the finger tip while reducing likelihood of straps 32/34 catching on or being ripped by a sharp edge of the finger.

Figure 9:
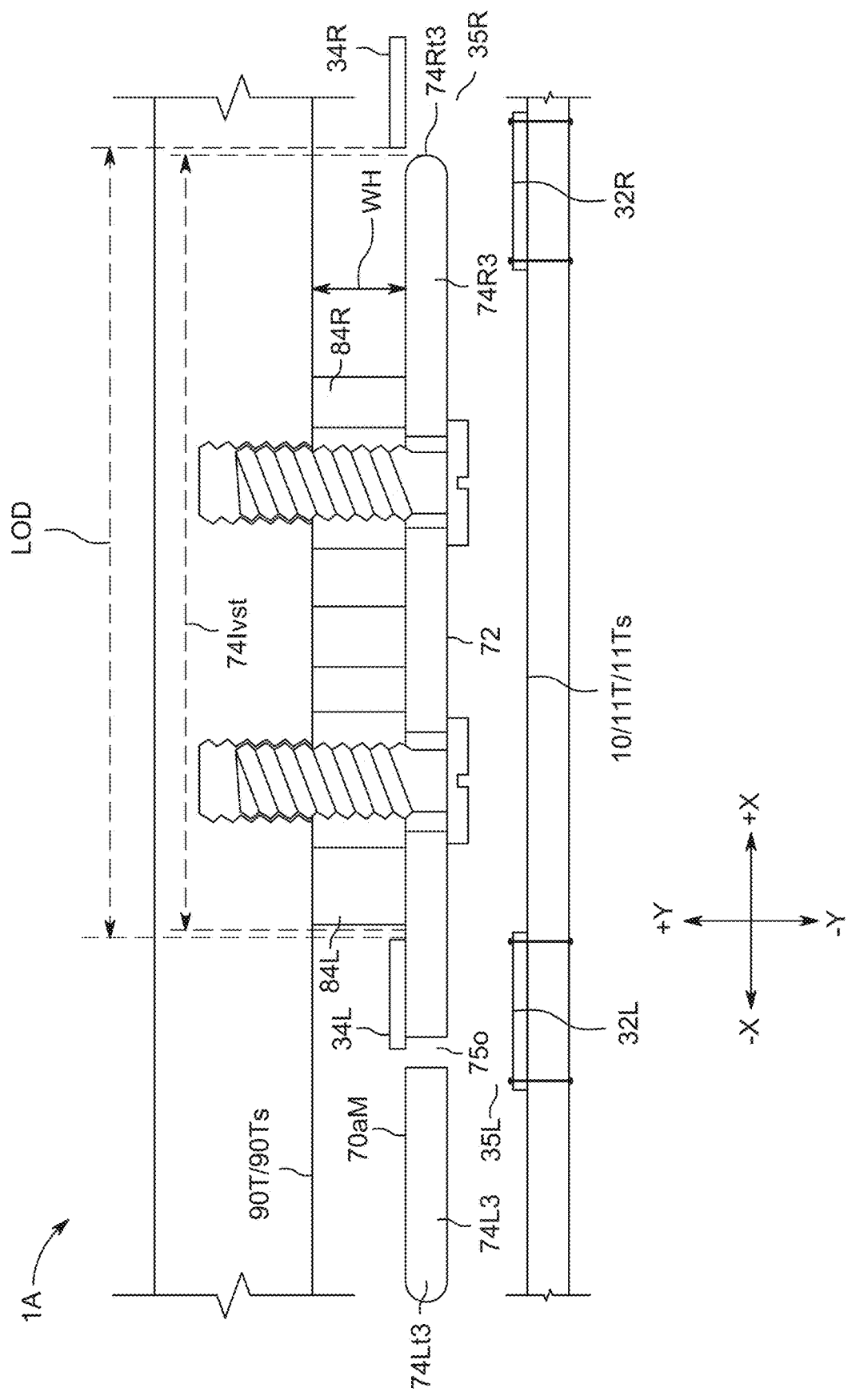
FIG. 9 is a cross-sectional view of the environment and the carrier mounting system of FIGS. 2-8, taken from line VII-VII of FIG. 6, in a third configuration, according to some embodiments.

Next, once alignment of left loop(s) 35L with left finger tip(s) 74Lt has been achieved, carrier 10 may be moved from the position of FIG. 8 to the position of FIG. 9 (e.g., by pulling opposing daisy chain webbing strap 34R (e.g., in the +X direction and the +Y direction) such that daisy chain webbing strap 34R of one, some, or each loop 35R of right daisy chain strap carrier mount mechanism 30aR may be aligned just to the right of yet also just above finger tip 74Rt of a finger 74R with which that loop is to interact for at least partially coupling mechanism 30aR to mount plate 70aM (e.g., such that the portion of daisy chain webbing strap 34R defining at least a portion of the middle loop 35R of right daisy chain strap carrier mount mechanism 30aR may be aligned just to the right of yet also above finger tip 74Rt3 of finger 74R3 such that the tip of finger 74R3 may be positioned to be received by that loop 35R (e.g., within working space distance WH)). As shown, during such movement of carrier 10 from the position of FIG. 8 to the position of FIG. 9, portion(s) of strap 34L defining loop(s) 35L may be further slid along one or more fingers 74L (e.g., loop 35L of FIGS. 8-10 may be further advanced along finger 74L3 in the +X direction towards body 72). In some embodiments, such movement in the +X direction may occur until one or more portions of strap(s) 32L/34L defining that loop 35L may hit or otherwise abut valley 74Lv2 and/or valley 74Lv3 of plate 70aM adjacent finger 74L3 and/or an outer surface of washer 84L, which may or may not align with one or both of those valleys (e.g., FIG. 4 has been supplemented with indications of the relative positions of washers 84L and 84R with respect to plate 70aM of the particular embodiments of FIGS. 7-11).

In order to allow for such coupling action between FIG. 8 and FIG. 9, the length of a first finger may be longer than the length of a second finger opposite the first finger (e.g., a second finger extending in an opposite direction away from a plate body than the first finger), where the first finger may be received by a loop prior to the second finger being received by a loop during a coupling process. For example, as shown, length 73Lf of first finger 74L3 may be longer than length 73Rf of second finger 74R3 and first finger 74L3 may be received by loop 35L prior to second finger 74R3 being received by loop 35R during the coupling process of FIGS. 8-11. Additionally, or alternatively, as shown (see, e.g., FIGS. 2, 4, and 9), a length 74lvst between a valley 74Lv of first finger 74L3 and tip 74Rt3 of opposing second finger 74R3 may be less than (e.g., shorter than) opposing loop opening distance LOD between the opening of loop 35L receiving first finger 74L3 and the opposing opening of loop 35R receiving second finger 74R3 in order to allow for such coupling action between FIG. 8 and FIG. 9. Therefore, if one or both of valleys 74Lv2 and 74Lv3 of plate 70aM may be interacting with (e.g., touching) a portion of the strap(s) of loop 35L when loop 35L is pulled in the direction of +X from the position of FIG. 8 or otherwise to the position of FIG. 9, such interaction may prevent any further pulling of carrier 10 and loop 35R in the direction of +X, whereby, if length 74lvst between a valley 74Lv of first finger 74L3 and tip 74Rt3 of opposing second finger 74R3 were to be greater than (e.g., longer than) opposing loop opening distance LOD between the opening of loop 35L receiving first finger 74L3 and the opposing opening of loop 35R receiving second finger 74R3, then it may prove difficult if not impossible to position carrier 10 and loop 35R in the position of FIG. 9 for enabling loop 35R to receive finger tip 74Rt3 of finger 74R3 for enabling the coupling process of FIGS. 8-11. That is, if loop 35L were pulled in the direction of +X to the position of FIG. 9 while system 1A was configured such that length 74lvst was greater than opposing loop opening distance LOD, then loop 35R may not be able to be pulled far enough in the +X direction beyond tip 74Rt3 to enable loop 35R to receive finger 74R3, thereby jeopardizing the integrity of any coupling between subsystems 20 and 60 for coupling carrier 10 to environment component 90.

Figure 10:
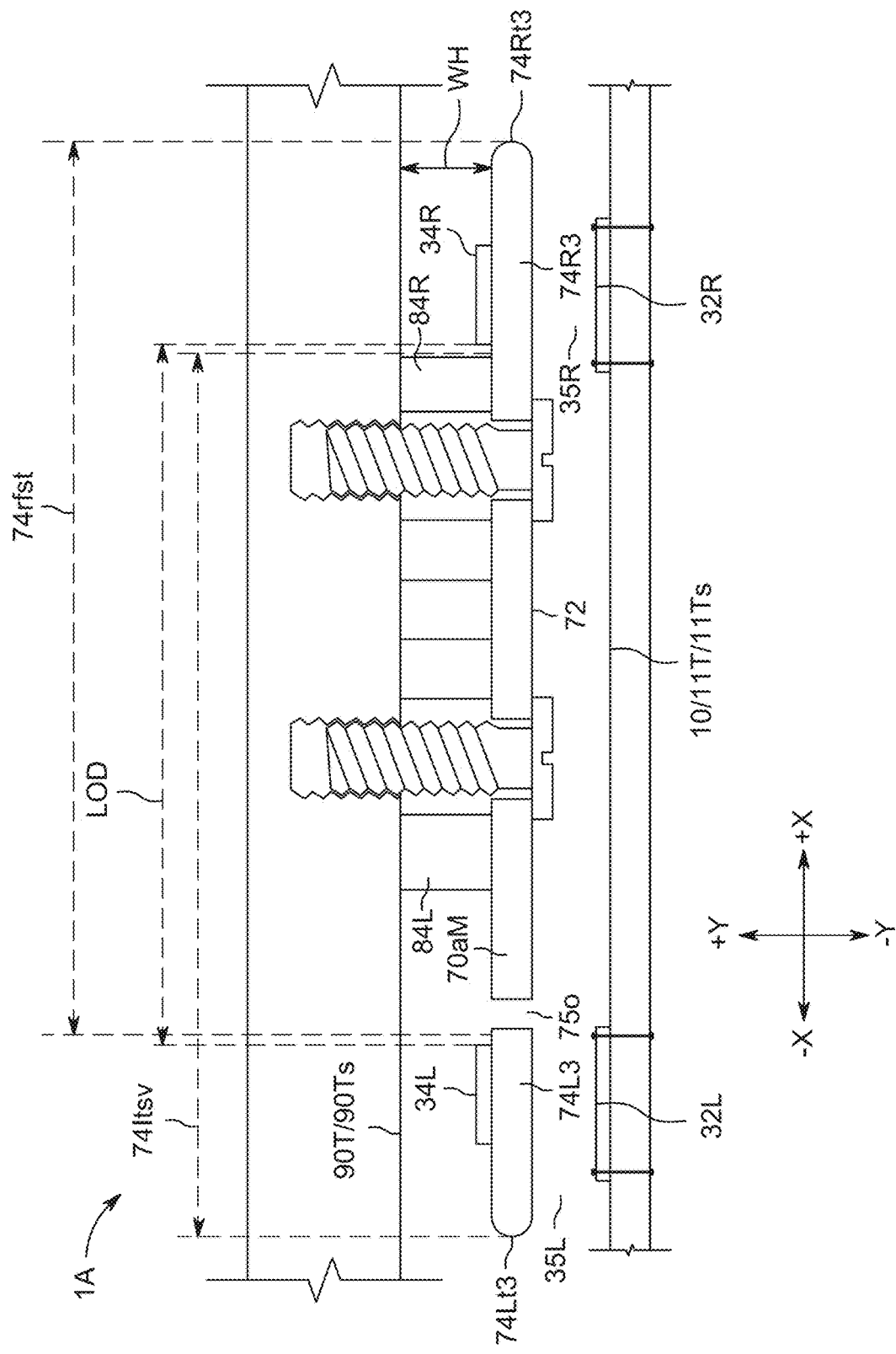
FIG. 10 is a cross-sectional view of the environment and the carrier mounting system of FIGS. 2-9, taken from line VII-VII of FIG. 6, in a fourth configuration, according to some embodiments.

Then, once alignment of right loop(s) 35R with right finger tip(s) 74Rt has been achieved while a portion of left finger(s) 74L remain within left loop(s) 35L, carrier 10 may be moved from the position of FIG. 9 to the position of FIG. 10 (e.g., by pulling carrier 10 (e.g., in the −X direction) such that daisy chain webbing strap 34R of one, some, or each loop 35R of right daisy chain strap carrier mount mechanism 30aR may be slid onto one or more fingers 74R (e.g., loop 35R of FIGS. 8-10 may be advanced along finger 74R3 in the −X direction toward body 72) and such that daisy chain webbing strap 34L of one, some, or each loop 35L of left daisy chain strap carrier mount mechanism 30aL may be slid back along but not off of one or more fingers 74L (e.g., loop 35L of FIGS. 8-10 may be retracted along finger 74L3 in the −X direction away from body 72). In some embodiments, such movement in the −X direction may occur until one or more portions of strap(s) 32R/34R defining that loop 35R may hit or otherwise abut valley 74Rv2 and/or valley 74Rv3 of plate 70aM adjacent finger 74R3 and/or an outer surface of washer 84R, which may or may not align with one or both of those valleys.

In order to allow for such coupling action from FIG. 9 to FIG. 10, the length of a first finger may be longer than the length of a second finger opposite the first finger (e.g., a second finger extending in an opposite direction away from a plate body than the first finger), where the first finger may be received by a loop prior to the second finger being received by a loop during a coupling process. For example, as shown, length 73Lf of first finger 74L3 may be longer than length 73Rf of second finger 74R3 and second finger 74R3 may be received by loop 35R after first finger 74L3 being received by loop 35L during the coupling process of FIGS. 8-11. Additionally, or alternatively, as shown (see, e.g., FIGS. 2, 4, and 10), a length 74*ltsv* between tip 74Lt3 of first finger 74L3 and a valley 74Rv of opposing second finger 74R3 may be greater than opposing loop opening distance LOD between the opening of loop 35L receiving first finger 74L3 and the opposing opening of loop 35R receiving second finger 74R3 in order to allow for such coupling action from FIG. 9 to FIG. 10. Therefore, if one or both of valleys 74Rv2 and 74Rv3 of plate 70aM may be interacting with (e.g., touching) a portion of the strap(s) of loop 35R when loop 35R is pulled in the direction of −X from the position of FIG. 9 or otherwise to the position of FIG. 10, such interaction may prevent any further pulling of carrier 10 and loop 35L in the direction of −X, whereby, if length 74*ltsv* between a valley 74Rv of second finger 74R3 and tip 74Lt3 of opposing first finger 74L3 were to be less than opposing loop opening distance LOD between the opening of loop 35L receiving first finger 74L3 and the opposing opening of loop 35R receiving second finger 74R3, then it may prove difficult if not impossible to position carrier 10 and loops 35L and 35R in the position of FIG. 10 for enabling both loops 35L and 35R to be receiving respective fingers 74L3 and 74R3 for maintaining the coupling of FIGS. 8-11. That is, if loop 35R were pulled in the direction of −X to the position of FIG. 10 while system 1A was configured such that length 74*ltsv* was less than opposing loop opening distance LOD, then loop 35L may slip off of finger 74L3, thereby jeopardizing the integrity of any coupling between subsystems 20 and 60 for coupling carrier 10 to environment component 90.

Then, once subsystem 20 is positioned with respect to subsystem 60 in any suitable position (e.g., a functionally coupled position (e.g., a position of FIG. 10)), the system may be adjusted (e.g., from the configuration of FIG. 10 to the configuration of FIG. 10A) for retaining the subsystems in that position and/or for preventing at least one type of movement of subsystem 20 with respect to subsystem 60. For example, while a portion of one or more right finger(s) 74R remain within one or more right loop(s) 35R and while a portion of one or more left finger(s) 74L remain within one or more left loop(s) 35L, system 1A may be adjusted from the configuration of FIG. 10 to the configuration of FIG. 10A, whereby any suitable retention assembly 75 may be activated or engaged or otherwise used for retaining one or more of the loops in that position and/or for preventing at least one type of movement of one or more of the loops. For example, retention assembly 75 may include any suitable retention mechanism 75*f* being coupled to the system for preventing subsystem 20 from moving with respect to subsystem 60 in the +X direction beyond a particular amount. For example, as shown, retention mechanism 75*f* may be coupled to plate 70am at a position along finger 74L3 that may be operative to prevent subsystem 30 moving further in the +X direction with respect to subsystem 60 (e.g., retention mechanism 75*f* may be a nut/bolt mechanism or any other suitable mechanism that may be secured to plate 70aM via opening 75o therethrough (e.g., through a portion of finger 74L3 between surfaces 70aMts and 70aMbs or any other portion of the plate) such that the structure of mechanism 75*f* may be operative to block or prevent movement of subsystem 20 (e.g., strap 34L and/or strap 32L of loop 35L) in the +X direction with respect to subsystem 60 (e.g., with respect to plate 70aM)). Any other suitable retention mechanism may be used, such as a sharp pin feature held in a position along plate 70 that may be operative to pierce through a portion of strap 32L/34L for holding subsystem 20 in that position with respect to subsystem 60, or may be a zip tie or selectively closed loop (not shown) that may be passed through a retaining opening 75o and also through a loop that it may be intended to retain. In some embodiments, such retention action for prevention of certain movement of subsystem 20 with respect to subsystem 60 (e.g., movement in the +X direction beyond the position of FIG. 10) may prevent movement that may release a loop from a finger or otherwise jeopardize the integrity of the coupling.

Figure 10A:
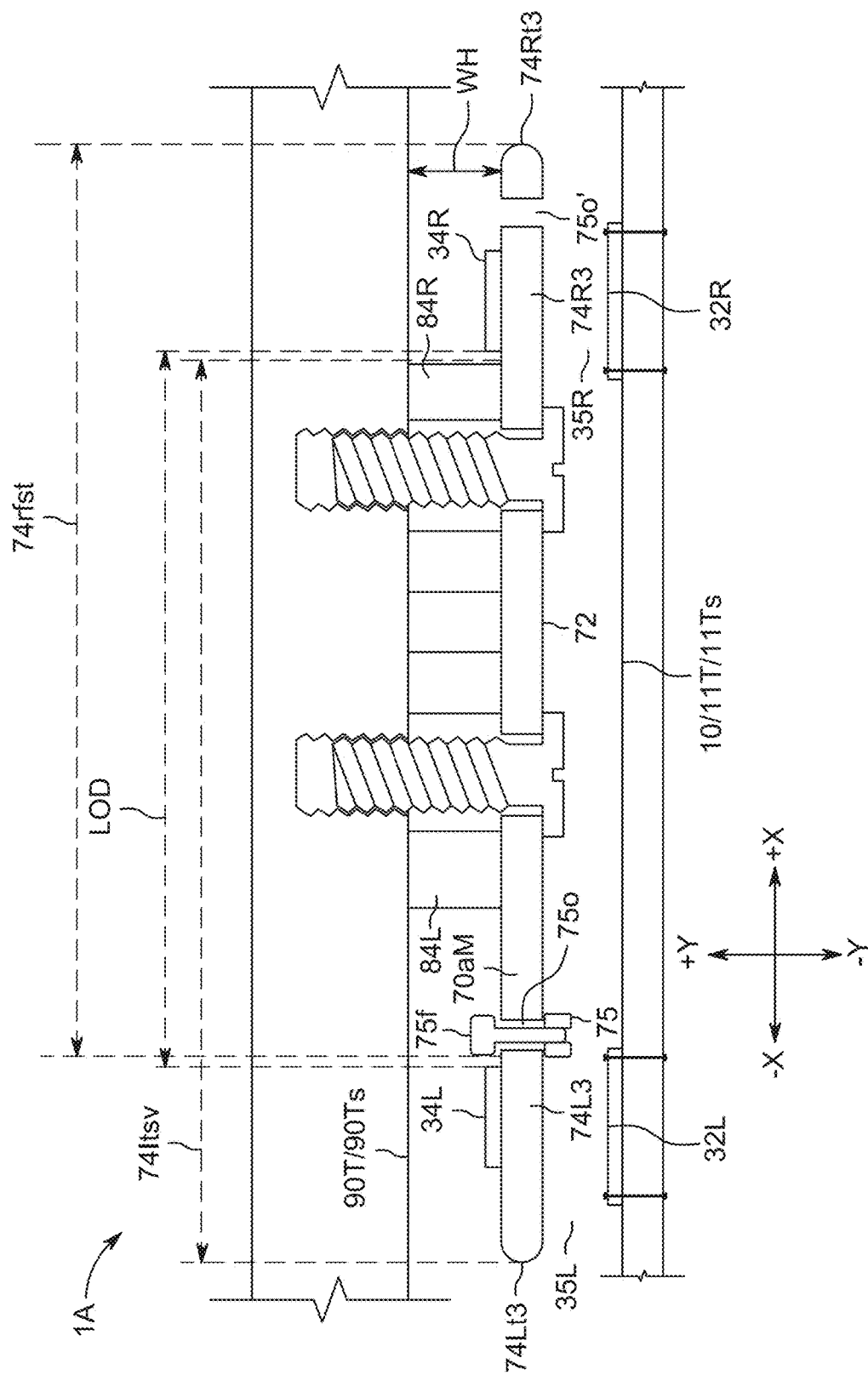
FIG. 10A is a cross-sectional view of the environment and the carrier mounting system of FIGS. 2-10, taken from line VII-VII of FIG. 6, in a fifth configuration, according to some embodiments.

In order to allow for such retaining action between FIG. 10 and FIG. 10A, the length of a first finger may be longer than the length of a second finger opposite the first finger (e.g., a second finger extending in an opposite direction away from a plate body than the first finger), where the first finger may be received by a loop prior to the second finger being received by a loop during a coupling process. For example, as shown, length 73Lf of first finger 74L3 may be longer than length 73Rf of second finger 74R3 and second finger 74R3 may be received by loop 35R after first finger 74L3 being received by loop 35L during the coupling process of FIGS. 8-11. Additionally, or alternatively, as shown (see, e.g., FIGS. 2, 4, 10, and 10A), a length 74*rfst* between the functional position of retainer assembly 75 (e.g., retainer opening 75o or otherwise) along finger 74L3 that may interact with loop 35L and tip 74Rt3 of opposing second finger 74R3 may be greater than opposing loop opening distance LOD between the opening of loop 35L receiving first finger 74L3 and the opposing opening of loop 35R receiving second finger 74R3 in order to allow for such retaining action between FIG. 10 and FIG. 10A. Therefore, if retention assembly 75 along plate 70aM may be interacting with (e.g., touching) a portion of the strap(s) of loop 35L when loop 35L is attempted to be pulled in the direction of +X beyond its position of FIG. 10, such interaction may prevent any further pulling of carrier 10 and loop 35R in the direction of +X, whereby, if length 74*rfst* were to be less than opposing loop opening distance LOD between the opening of loop 35L receiving first finger 74L3 and the opposing opening of loop 35R receiving second finger 74R3, then it may prove difficult if not impossible to retain finger 74R3 within loop 35R for maintaining the coupling of FIGS. 8-11. That is, if loop 35R were to be attempted to be pulled in the direction of +X beyond the position of FIG. 10A while system 1A was configured without retention assembly 75 or such that length 74rfst provided by retention assembly 75 was less than opposing loop opening distance LOD, then loop 35R may slip off of finger 74R3, thereby jeopardizing the integrity of any coupling between subsystems 20 and 60 for coupling carrier 10 to environment component 90. In other embodiments, any suitable retention assembly 75 may be coupled to any other suitable portion of system 1A for preventing such action. For example, a similar retention assembly 75 or otherwise may be coupled to plate 70aM via an opening through finger 74R3 or otherwise that is beyond loop 35R in the +X direction (e.g., via an opening 75o' shown in FIG. 10A) for directly preventing +X direction movement of loop 35R, rather than or in addition to a retention assembly being positioned for directly preventing +X direction movement of loop 35L. In some embodiments, a retaining opening may be provided along a front most finger (see, e.g., opening 75fo' of FIG. 13), which may make installation/accessibility of an associated retaining feature easier for an end user.

While such a subsystem 60 with mounting plate 70aM may be coupled to any suitable environment component of any suitable environment, certain configurations may pose certain likely situations. For example, when mounting plate 70aM is coupled to surface 90Ts of top wall 90T of truck environment 99P, the orientation of certain fingers with respect to the front of the truck may be varied. For example, in the embodiments of FIGS. 5-11, subsystem 60 may be coupled to environment 99P such that fingers 74L extend away from body 72 of plate 70aM in the same −X direction as the forward direction of the vehicle (e.g., the vehicle runs from back to front in the direction of −X) and such that fingers 74R extend away from body 72 of plate 70aM in the same +X direction as the reverse direction of the vehicle. Therefore, in such embodiments, when the vehicle is driving forward (e.g., in the direction of −X) and then stops suddenly, subsystem 20/carrier 10 may attempt to travel further in the −X direction with respect to subsystem 60/vehicle component 90, such that valleys 74Rv of finger(s) 74R or otherwise (e.g., washer 84R) may interact with straps 32R/34R of loop(s) 35R to stop such movement of loop straps 32R/34R of subsystem 20 further along finger(s) 74R in the −X direction to prevent too much movement of subsystem 20 that may otherwise result in loop(s) 35L sliding off of finger(s) 74L and jeopardizing the integrity of the coupling of subsystems 20 and 60.

Additionally or alternatively, in such embodiments, when the vehicle is driving backwards (e.g., in the direction of +X) and then stops suddenly, subsystem 20/carrier 10 may attempt to travel further in the +X direction with respect to subsystem 60/vehicle component 90, such that retainer assembly 75 may interact with straps 32/34 of one or more loops 35 to stop such movement of such loop straps of subsystem 20 further along finger(s) 74 in the +X direction to prevent too much movement of subsystem 20 that may otherwise result in loop(s) 35R sliding off of finger(s) 74R and jeopardizing the integrity of the coupling of subsystems 20 and 60. Additionally or alternatively, if the vehicle were to be hit on one of its sides (e.g., on wall 90L in the −Z direction or on wall 90R in the +Z direction), loop straps may interact with the finger about which they are looped to prevent too much movement of subsystem 20 with respect to subsystem 60 along the Z-axis. Additionally or alternatively, if the vehicle were to hit a bump or otherwise move up in the +Y direction or down in the −Y direction, loop straps may interact with the finger about which they are looped to prevent too much movement of subsystem 20 with respect to subsystem 60 along the Y-axis. However, it is to be understood that mounting plate 70aM may be oriented in any other suitable orientation with respect to the forward direction of the vehicle and system 1A may still be operative to maintain the coupling of subsystem 20 and subsystem 60 reliably and safely.

Figure 11:
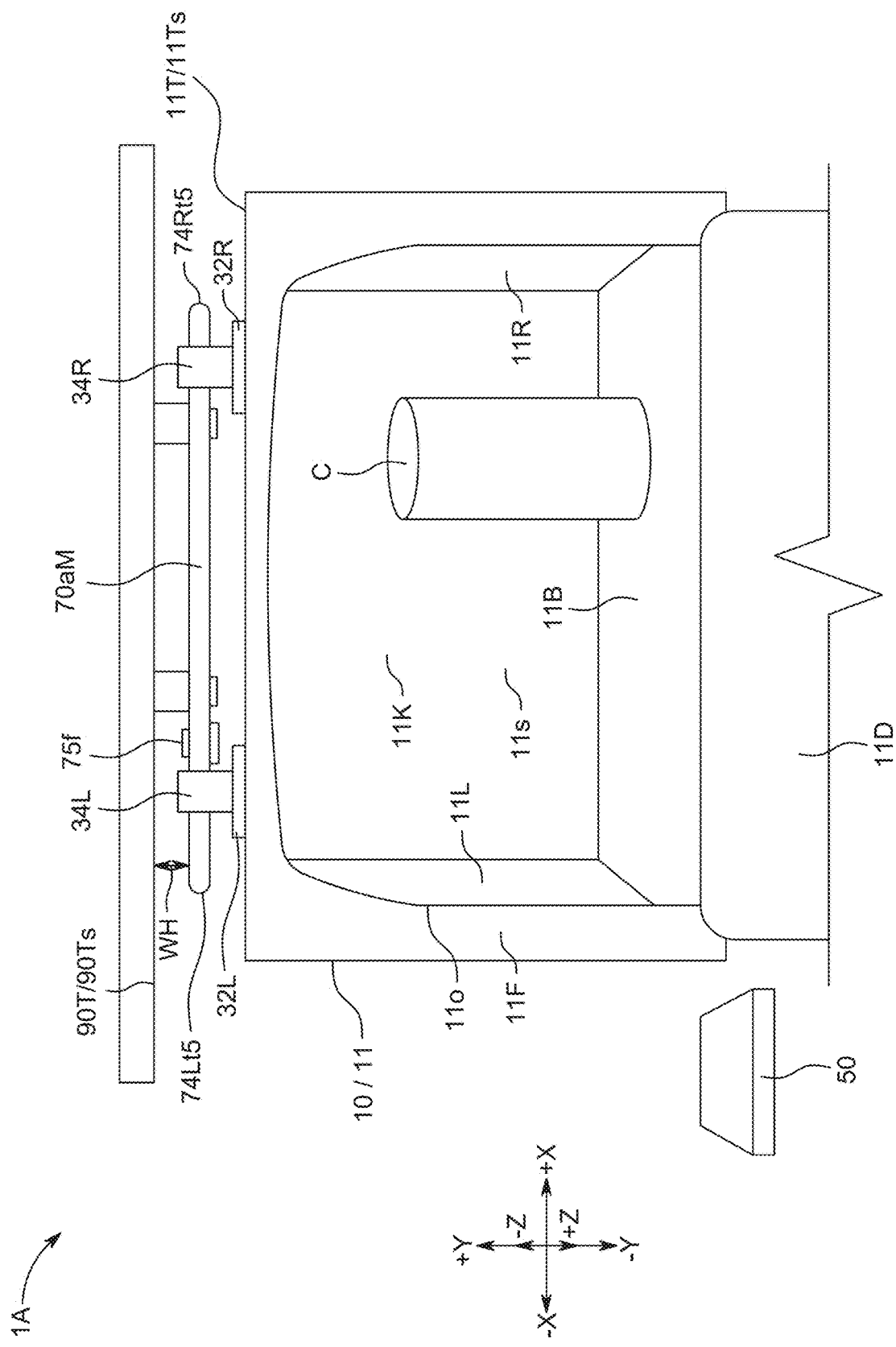
FIG. 11 is a side view of the environment and the carrier mounting system of FIGS. 2-10 and 10A, in a sixth configuration, according to some embodiments.

Once subsystem 20 has been coupled to carrier 10 and once subsystem 60 has been coupled to environment component 90T and once subsystem 60 has been coupled to subsystem 20 (e.g., with or without any retention assembly (ies), any suitable interaction may occur between a user and carrier 10, such as opening door 11D for accessing space 11s and any suitable cargo C (e.g., as shown in FIG. 11, where carrier 10 may not be provided with any external support beyond that provided by subsystem 20, subsystem 60, and environment component 90T (e.g., carrier 10 may be suspended from environment component 90T and then used for accessing space 11s)). In some embodiments, system 1A may also include any suitable carrier reinforcement, such as reinforcement 50 (e.g., a flat metal plate or otherwise (not shown to scale in FIG. 11)), which may be positioned within space 11s, such as along an exposed surface of bottom wall 11B within space 11s, for providing bottom wall 11B with some rigid structure when carrier 10 is suspended from environment component 90T, where such additional rigid structure may otherwise be unnecessary when carrier 10 is used when positioned with wall 11B resting on a shelf or the ground or otherwise.

It is to be understood that while FIGS. 7-11 may be predominantly described with respect to a process for coupling a carrier to an environment component, a process for decoupling may be substantially the reverse of the coupling operations described with respect to advancing from FIG. 7 to FIG. 8 to FIG. 9 to FIG. 10 to FIG. 10A to FIG. 11.

Any suitable geometries (e.g., shapes, sizes, measurements) and/or materials used for mechanisms 20, 30, 70, and/or 80 may be provided, which may depend on particular carrier and/or particular environment component being coupled with the system. For example, lengths, widths, thicknesses, shape, number, material(s), and/or spacing between fingers of a mounting plate may vary based on characteristic(s) of carrier and/or environment. Similarly, lengths, widths, thicknesses, shape, number, material(s), and/or spacing between loops of a daisy chain strap mount mechanism may vary based on characteristic(s) of carrier and/or environment. A cross-sectional shape of a finger (e.g., any suitable extension for interacting with a loop) and/or of a loop (e.g., any suitable closed or partially open loop or passageway for receiving a finger) may be the same, substantially the same, or different from one another and each may have any suitable shape at any suitable cross-section thereof, including, but not limited to, a circle, oval, triangle, square, parallelepiped, pentagon, rhomboid, hexagon, trapezoid, cruciform, and the like. It is to be understood that, in some embodiments, a cross-section of a loop may not be a closed loop but may form a shape (e.g., a passageway or space defined by a structure) that may functionally interact with and retain a relationship with respect to a finger or other mechanism of an environment mount mechanism (e.g., the loop may be provided by an S-clip or the like). Additionally or alternatively, a mounting plate (e.g., plate 70aM) and/or other possible environment mount mechanism(s) may be coupled to a carrier for use as a carrier mount mechanism 30 of a carrier mounting subsystem 20, while a daisy chain strap carrier mount mechanism (e.g., mechanism 30aL) and/or other possible carrier mount mechanism(s) may be coupled to an environment component for use as an environment mount mechanism 70 of an environment mounting subsystem 60 (e.g., for facilitating coupling substantially opposite to that of FIGS. 2-11 for carrier 10 and environment component 90).

Figure 12:
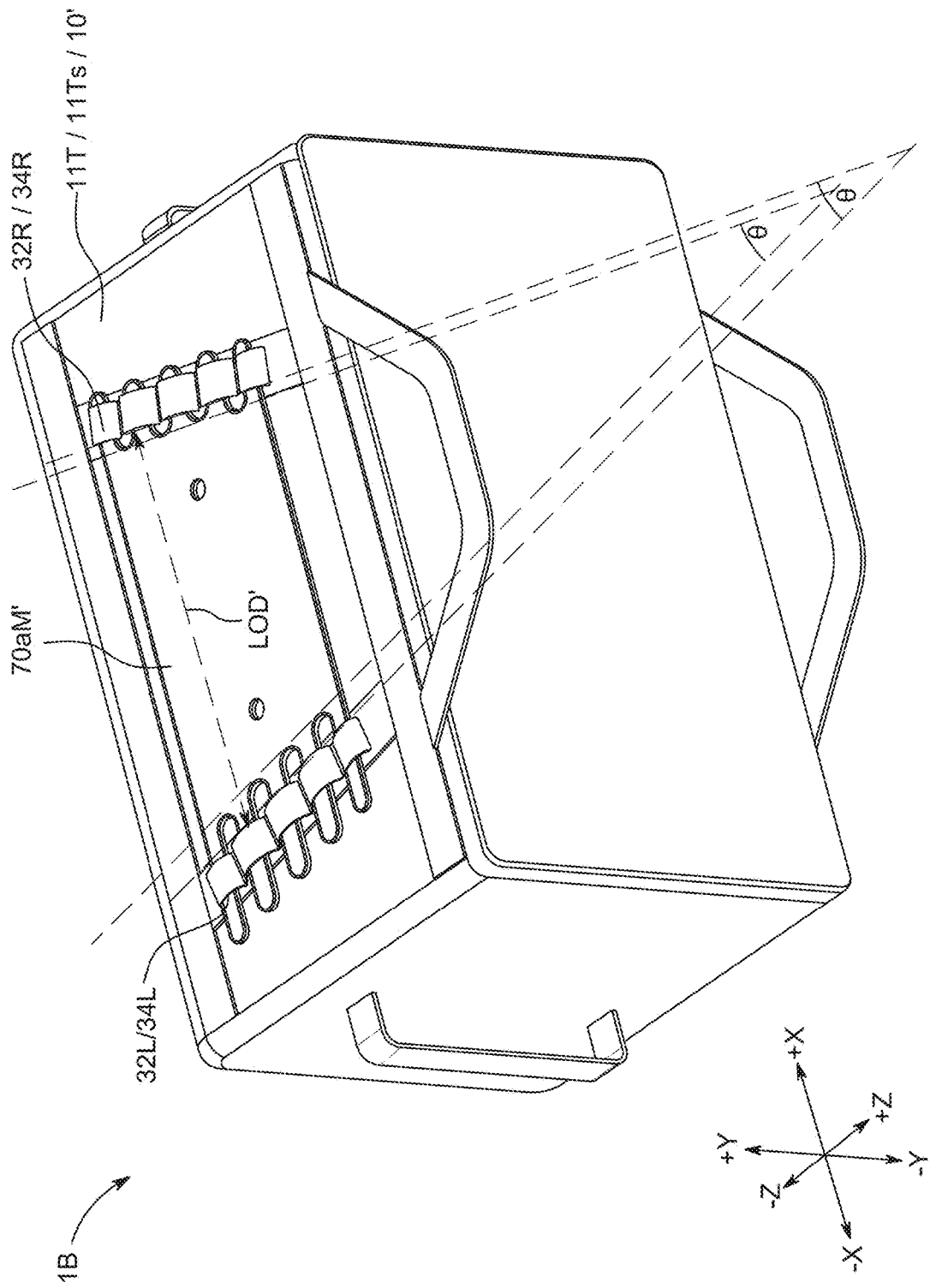
FIG. 12 is a perspective view of a carrier mounting system with a carrier, according to some embodiments.
Figure 13:
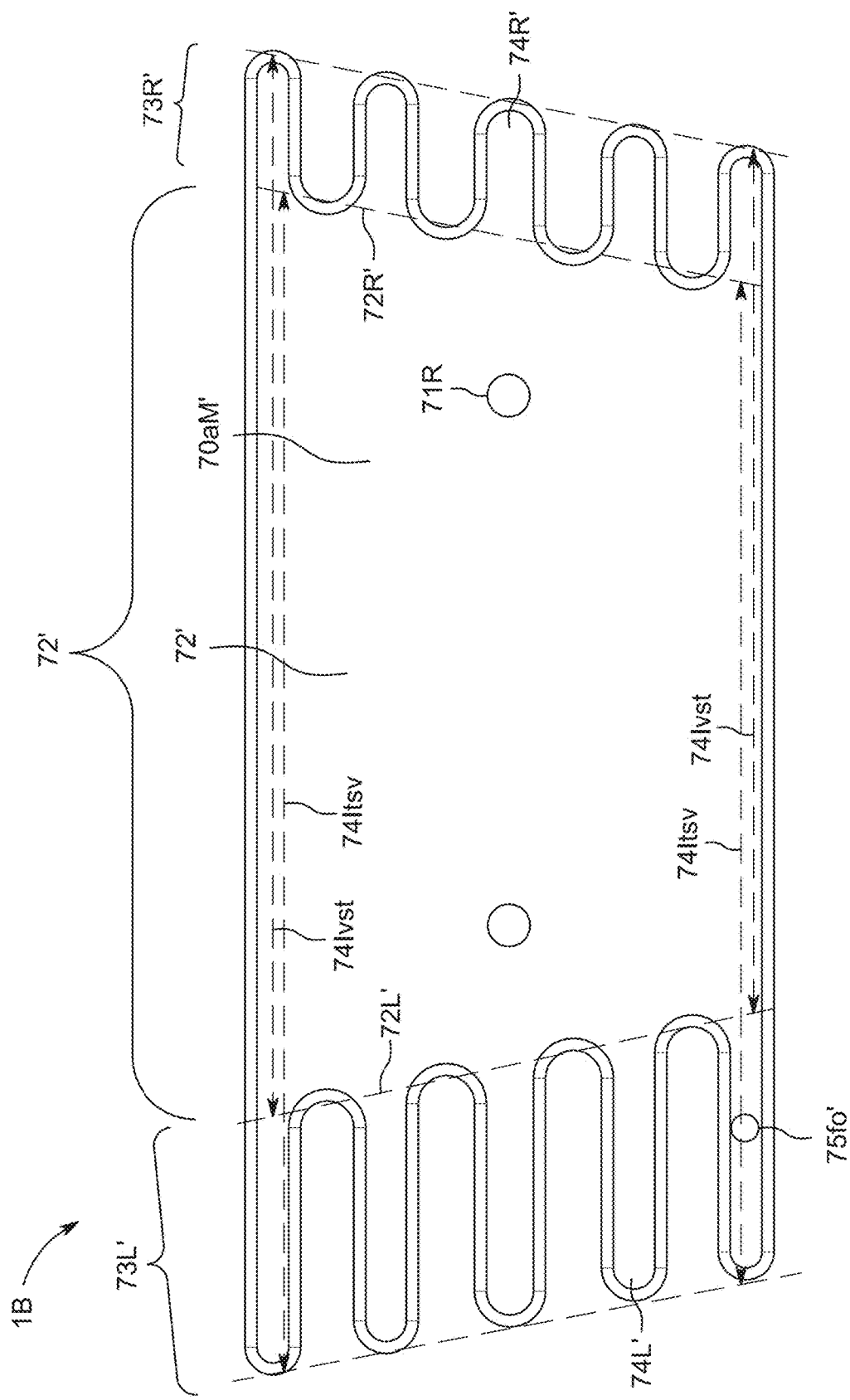
FIG. 13 is a top view of a portion of the carrier mounting system of FIG. 12, according to some embodiments.
Figure 15:
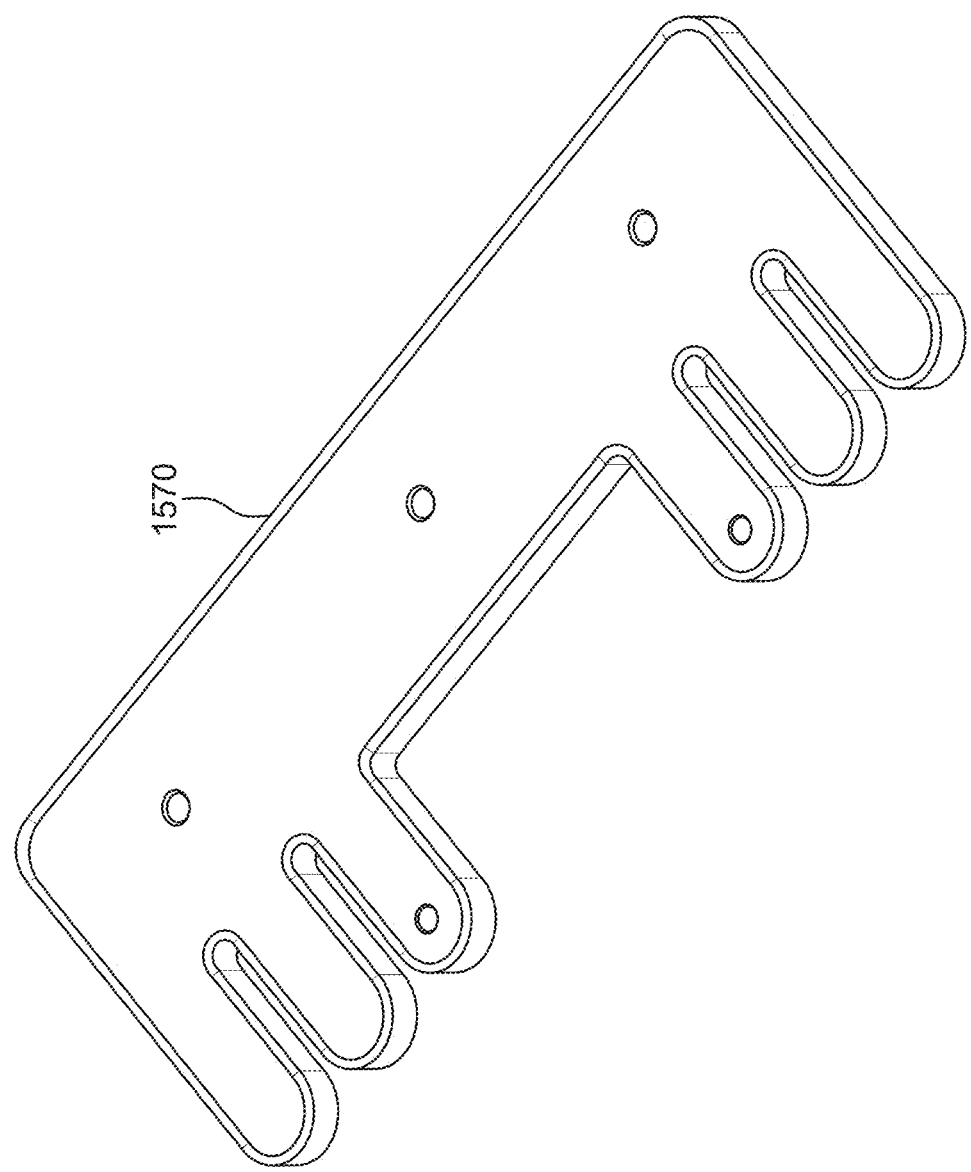
FIG. 15 is a perspective view of a portion of a carrier mounting system, according to some embodiments.

Although system 1A may be described for use with sets of opposing loops where the distance between loops is consistent for each set of loops (e.g., where base straps 32L and 32R (and/or daisy chain straps 34L and 34R) may extend parallel to one another along surface 11Ts of wall 11T of carrier 10), it is to be understood that any other suitable arrangement of loops may be provided by a subsystem 20 or by a carrier itself, which may utilize different arrangements of fingers for the coupling/decoupling process. For example, as shown in FIG. 12, a carrier 10' may include similar straps 32L/34L and straps 32R/34R to those of carrier 10 and subsystem 20, but on carrier 10' straps 32L and 32R (and/or daisy chain straps 34L and 34R) may not extend parallel to one another but may be non-parallel and may extend at any suitable angle with respect to one another along surface 11Ts of wall 11T of carrier 10'), such as some angle θ (e.g., as may be provided by certain carriers (e.g., similar to a Patagonia Black Hole Duffel type carrier)). Therefore, an alternative embodiment of a mounting plate, such as mounting plate 70aM' of FIGS. 12 and 13 may be used, where the length of each finger 74L' may be the same as one another (and, potentially the same as the length of each finger 74L), and/or where the length of each finger 74R' may be the same as one another (and, potentially the same as the length of each finger 74R), but the width of body 72' between its left and right edges (e.g., between left body side 72L' and right body side 72R') may vary between the front and back of the body (e.g., sides 72L' and 72R' may be non-parallel) such that the arrangement of adjacent finger tips and/or the arrangement of adjacent valleys along one particular side of the body may extend at any suitable angle (e.g., the same angle θ as the loops) with respect to the arrangement of adjacent finger tips and/or the arrangement of adjacent valleys along the other particular side of the body (e.g., any suitable angle or range of angles, such as 30°, 25°-35°, 20°-40°, 0°-40°, etc.). In such embodiments, length 74lvst of one set of opposing fingers of plate 70aM' may not be the same as the length 74lvst of another set of opposing fingers of plate 70aM', and/or the length 74ltsv of one set of opposing fingers of plate 70aM' may not be the same as the length 74ltsv of another set of opposing fingers of plate 70aM'. However, the same principles and operations may apply for coupling plate 70aM' with the loops of the straps of FIG. 12 as for coupling plate 70aM with the loops of FIGS. 2-11. In other embodiments, such as a system 1C of FIG. 14, a single base strap 32M and single daisy chain strap 34M may extend along a surface of a wall of a carrier 10" (e.g., which may be similar to The North Face Base Camp duffel) for providing a single daisy chain of loops 35M (e.g., in a linear fashion) without any opposing loops for use with a mounting plate with one or more fingers that do not oppose each other, such as a mounting plate 1570 of FIG. 15.

Figure 16:
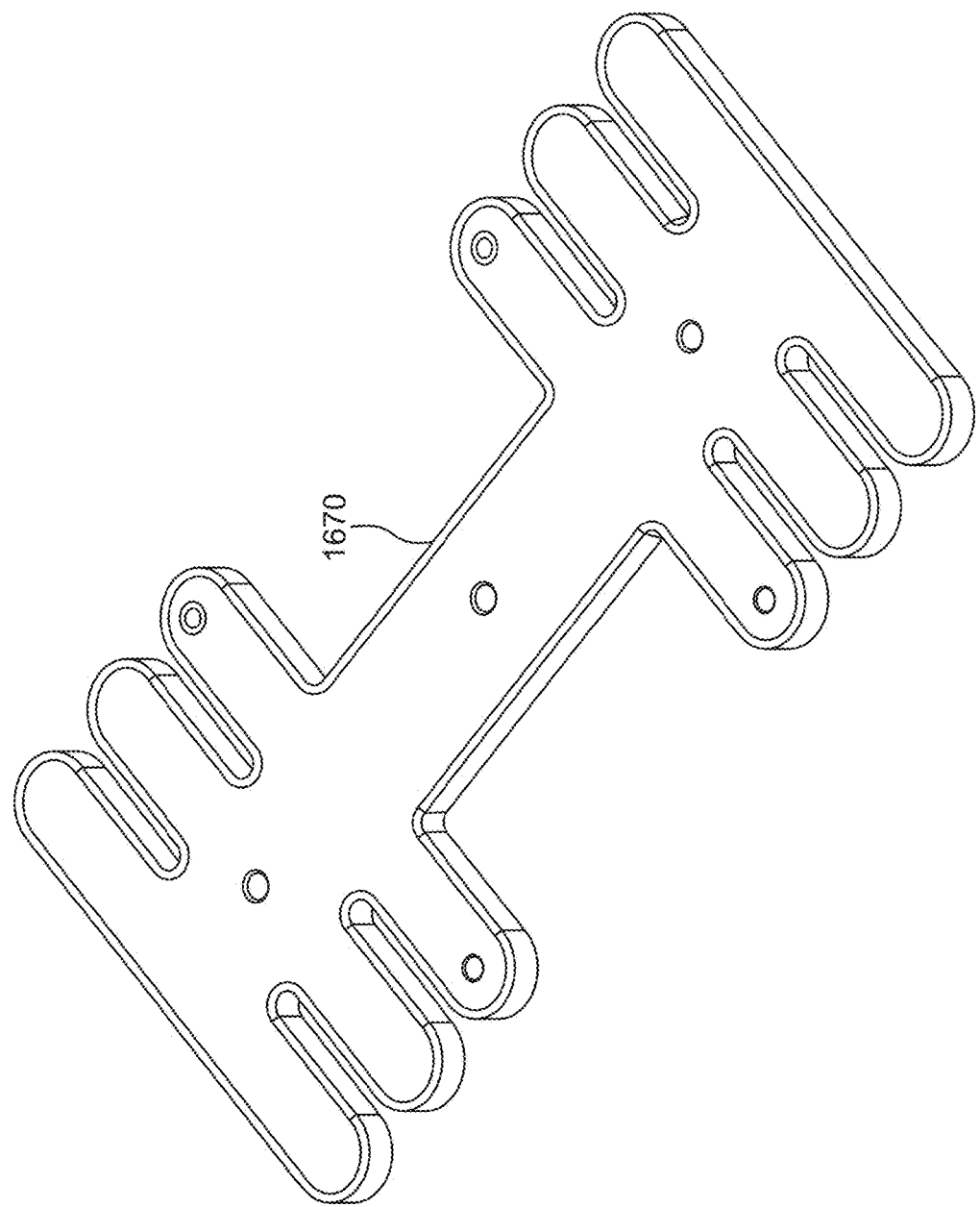
FIG. 16 is a perspective view of a portion of another carrier mounting system, according to some embodiments.
Figure 17:
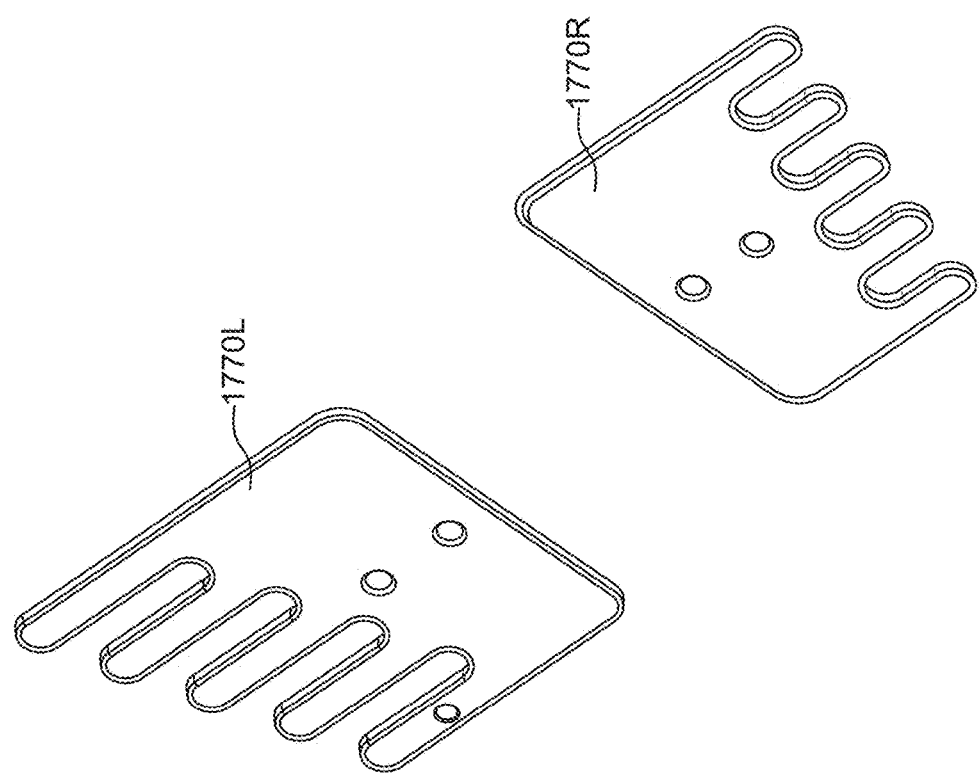
FIG. 17 is a perspective view of a portion of another carrier mounting system, according to some embodiments.
Figure 18:
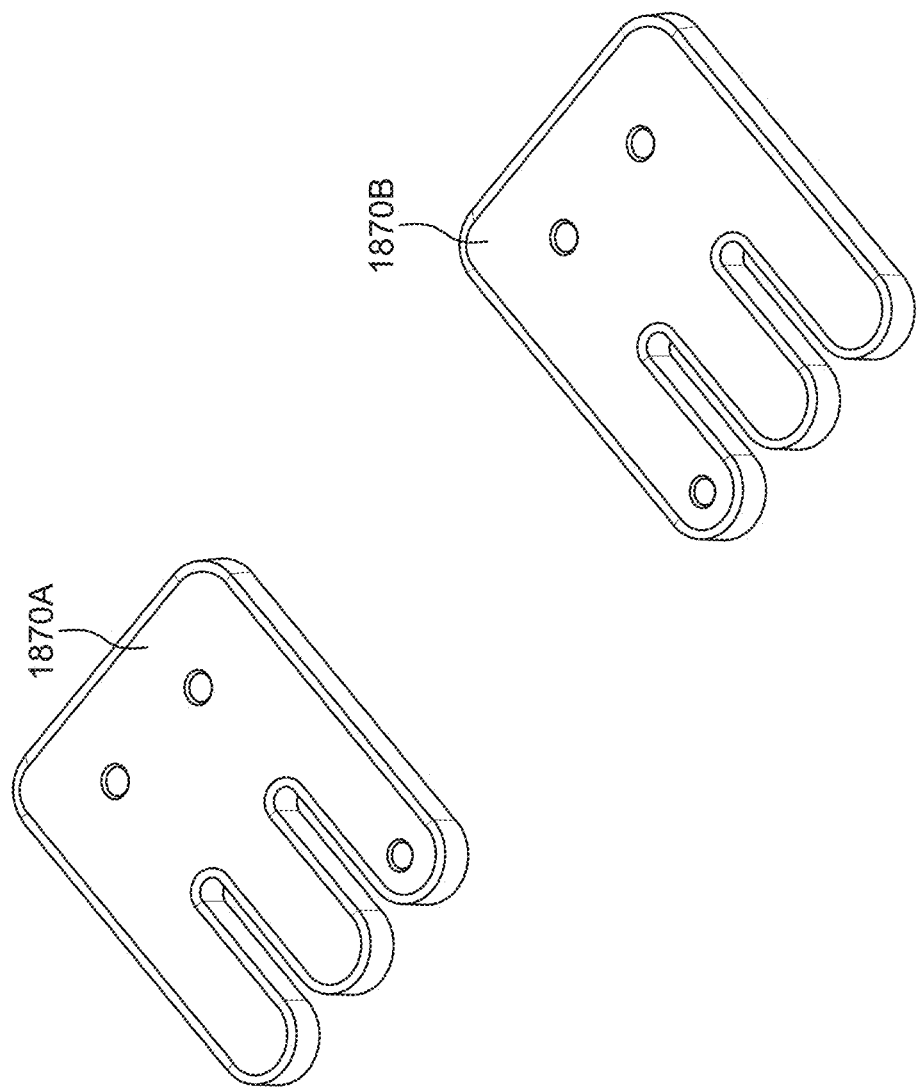
FIG. 18 is a perspective view of a portion of another carrier mounting system, according to some embodiments.
Figure 19:
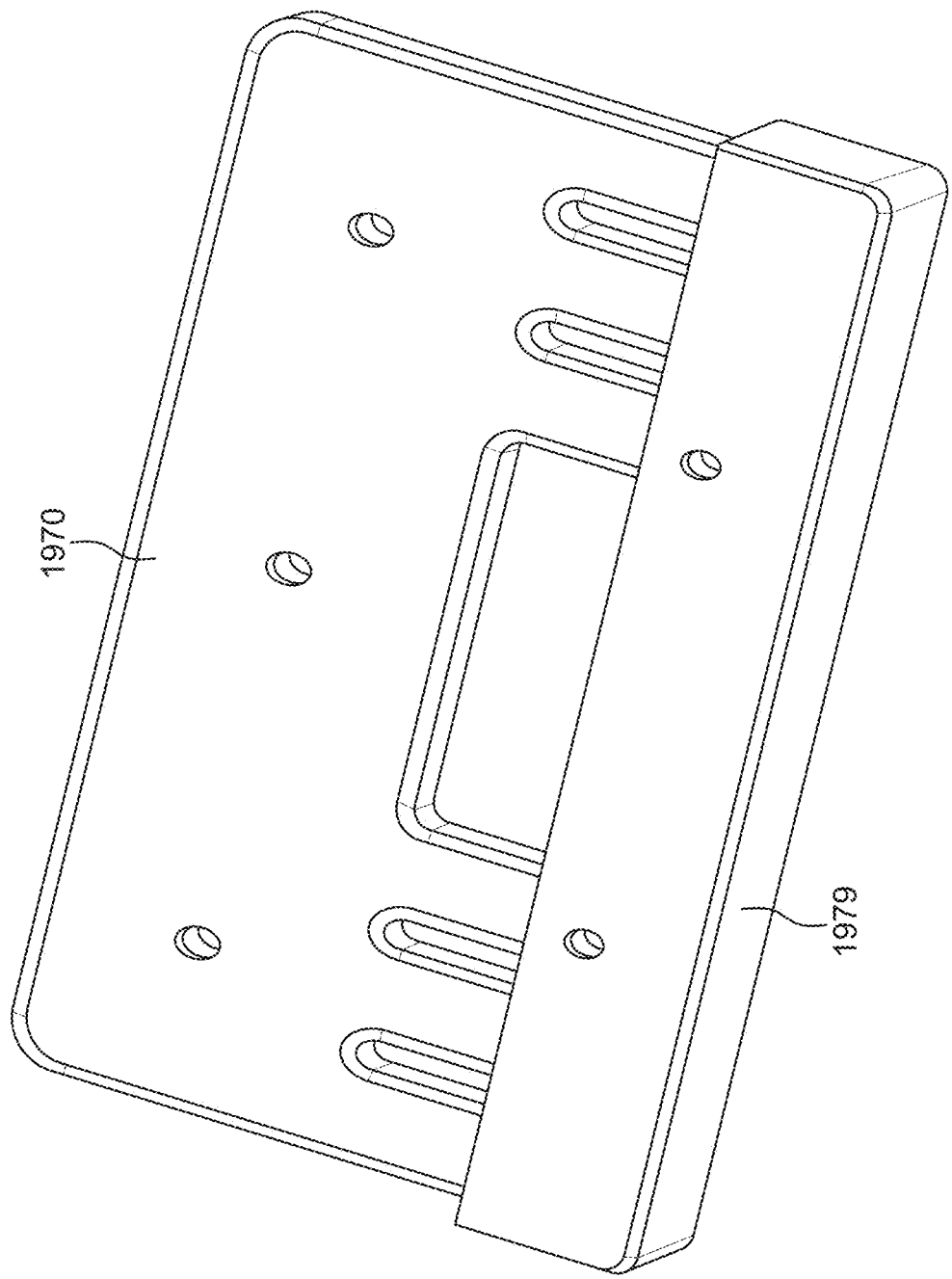
FIG. 19 is a perspective view of a portion of another carrier mounting system, according to some embodiments.
Figure 20:
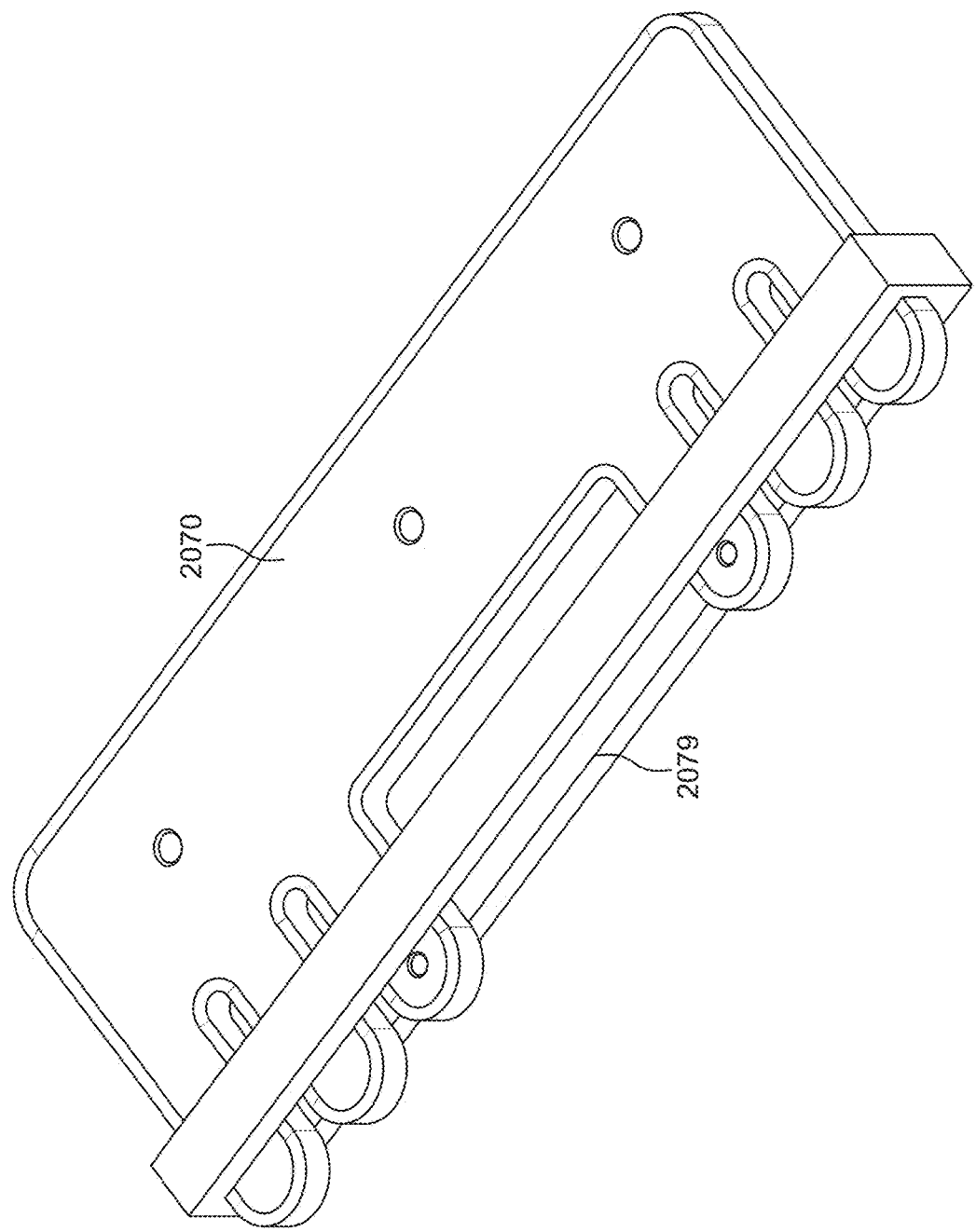
FIG. 20 is a perspective view of a portion of another carrier mounting system, according to some embodiments.
Figure 21:
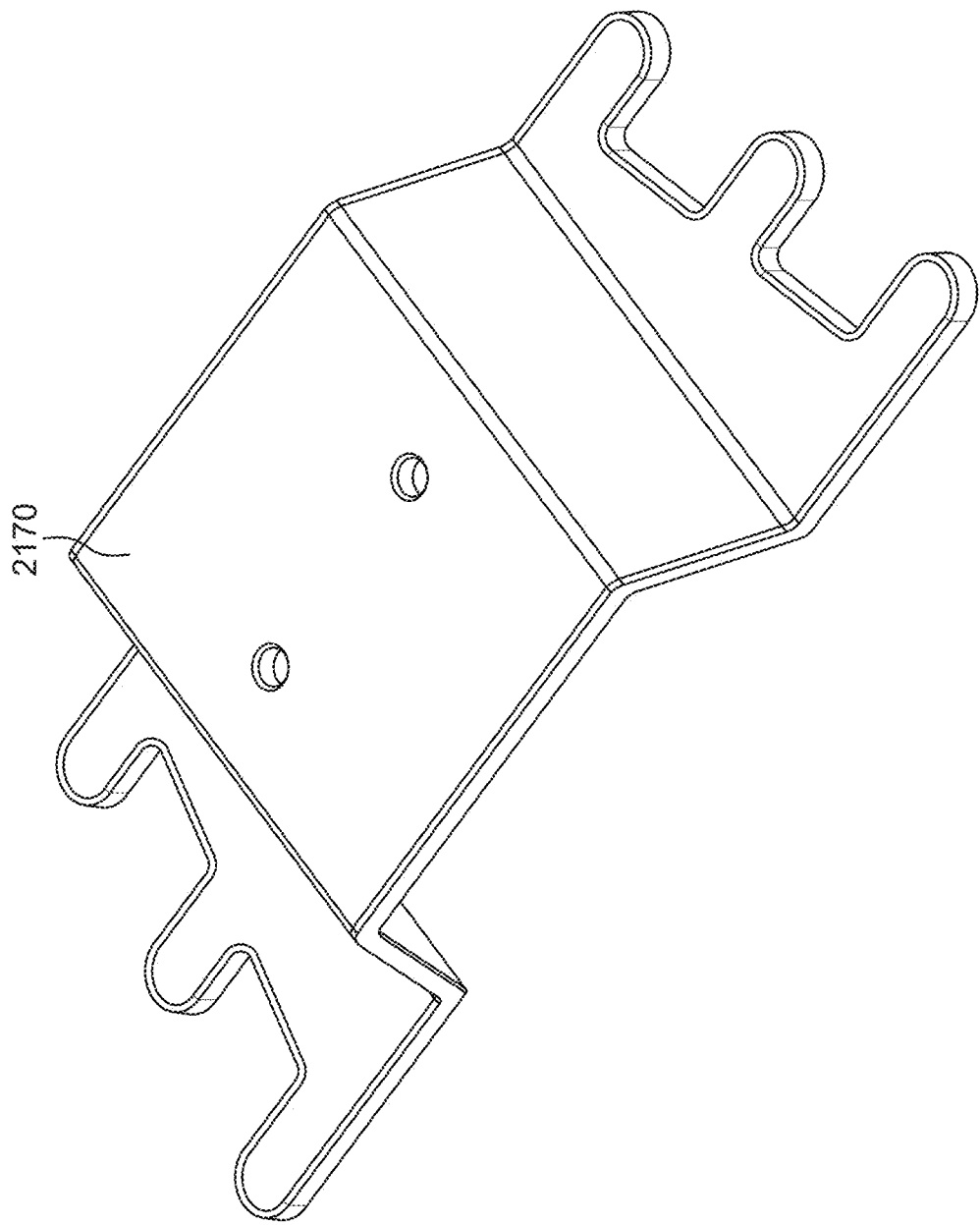
FIG. 21 is a perspective view of a portion of another carrier mounting system, according to some embodiments.
Figure 22:
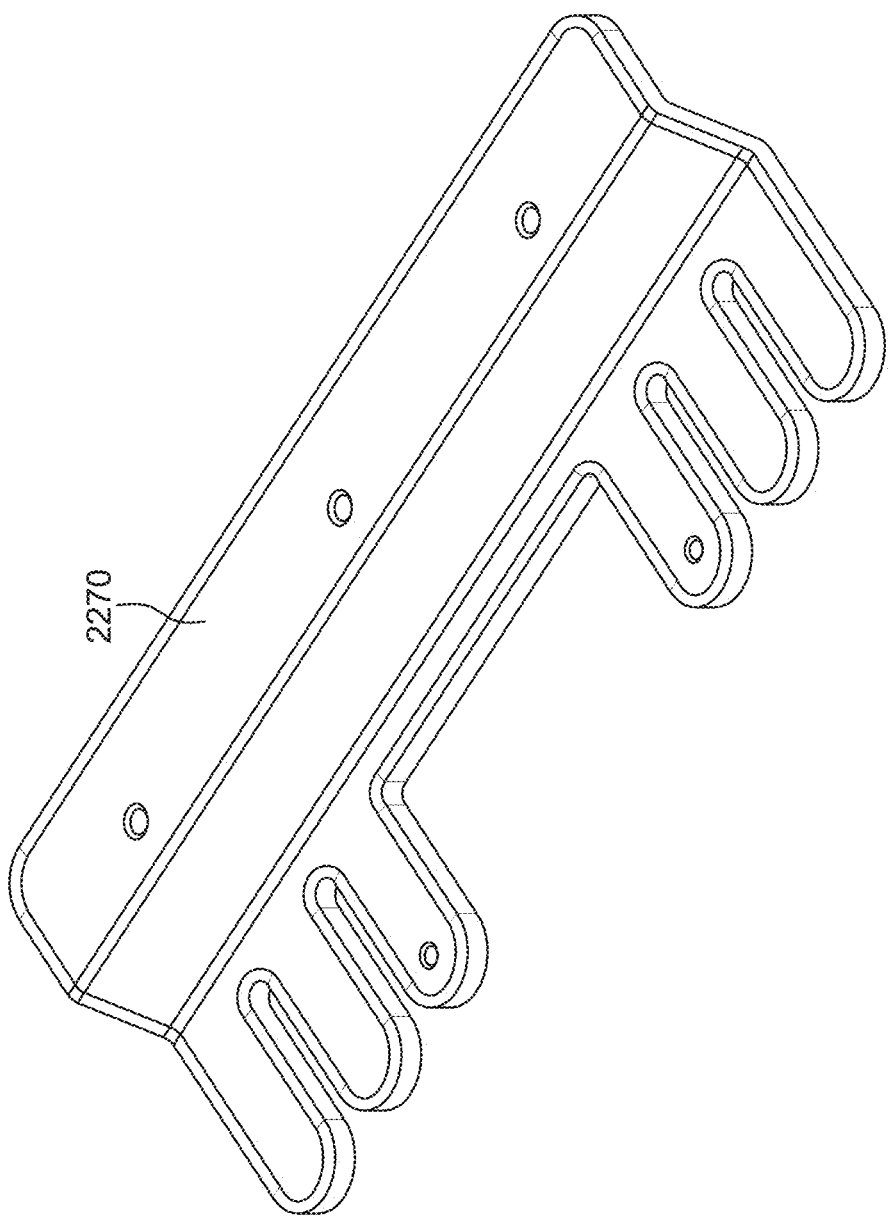
FIG. 22 is a perspective view of a portion of another carrier mounting system, according to some embodiments.
Figure 23:
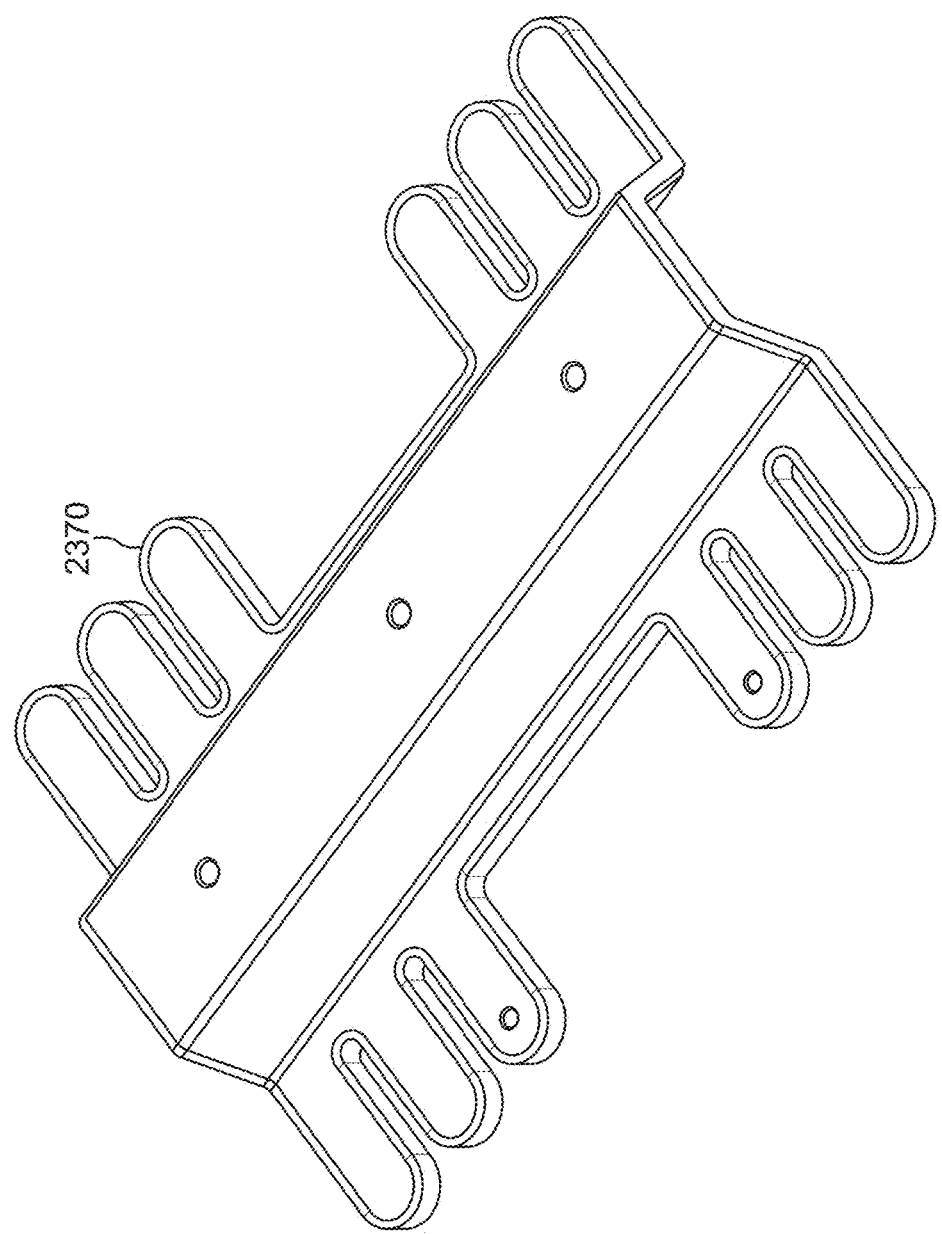
FIG. 23 is a perspective view of a portion of another carrier mounting system, according to some embodiments.
Figure 24:
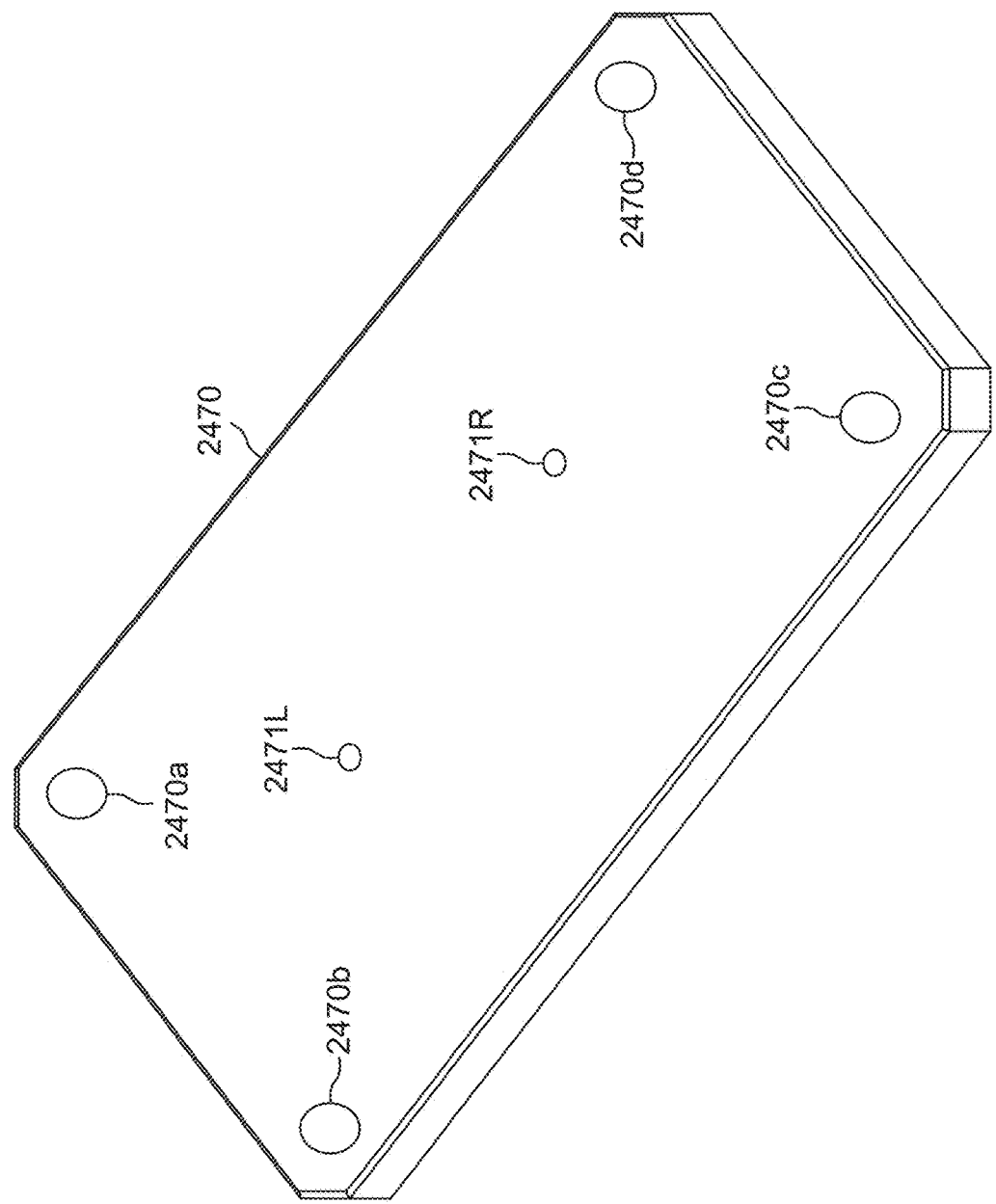
FIG. 24 is a perspective view of a portion of another carrier mounting system, according to some embodiments.

Various other mounting plate types may be possible and used in various situations. For example, plate 1670 of FIG. 16 may be similar to plate 1570 but may have sets of fingers extending in opposite directions. Plates 1770L and 1770R of FIG. 17 may be similar to plate 70aM' but with its body split into two distinct body portions, so different sets of fingers may be independently coupled to an environment component (see, e.g., FIG. 6, where plate 1770R may be coupled to surface 90Rs of right wall 90R of environment 99P). Split sets of fingers may enable for two or more smaller mounting plates rather than one larger mounting plate (e.g., when the opposing sets of fingers are to be a significant distant apart or a distance apart that may be customizable by the end user by varying the distance between the plates during coupling to the environment (e.g., the distance therebetween may be variable based on the type of carrier to be used)). Plates 1870A and 1870B of FIG. 18 may be similar to plate 1570 but with its body split into two distinct body portions, so different sets of fingers may be independently coupled to an environment component. Plate 1970 of FIG. 19 may be similar to plate 1570 but may be provided along with a closed bar clamp 1979 that may be coupled in any suitable way to one or more fingers of plate 1970 (e.g., using any suitable additional retaining mechanisms or a tight fit) once loops have been passed onto the fingers such that clamp 1979 may trap the straps/loops on the one or more fingers protected by the clamp. Plate 2070 of FIG. 20 may be similar to plate 1570 but may be provided along with an open ended bar clamp 2079 that may be coupled in any suitable way to one or more fingers of plate 2070 (e.g., using any suitable additional retaining mechanisms or a tight fit) once loops have been passed onto the fingers such that clamp 2079 may trap the straps/loops on the one or more fingers protected by the clamp. Plate 2170 of FIG. 21 may be similar to plate 70aM' but with less fingers and with a portion of its central body being offset (e.g., raised) with respect to its fingers, which may obviate the need for washers or other components for generating a working space distance (e.g., distance WH the mounting surface of the environment component and the surface(s) of the finger(s)) (see, e.g., FIG. 6, where plate 2170 may be coupled to a top surface 90Hs of a shelf 90H of environment 99P). Plate 2270 of FIG. 22 may be similar to plate 1570 but with a portion of its central body being offset (e.g., raised) with respect to its fingers, which may obviate the need for washers or other components for generating a working space distance (e.g., distance WH the mounting surface of the environment component and the surface(s) of the finger(s)) (see, e.g., FIG. 6, where plate 2270 may be coupled to surface 90Ls of left wall 90L of environment 99P). Plate 2370 of FIG. 23 may be similar to plate 1670 but with a portion of its central body being offset (e.g., raised) with respect to its fingers, which may obviate the need for washers or other components for generating a working space distance (e.g., distance WH the mounting surface of the environment component and the surface(s) of the finger(s)). In some embodiments, at least a portion of a plate may be curved such that the tips of adjacent fingers may be arranged along a curve rather than linearly (see, e.g., FIG. 6, where such a plate 2170c may be coupled to a curved surface 90Cs of a curved wall 90C of environment 99P). In some embodiments a mounting plate may not include one or more fingers, but may include one or more carrier retaining passageways that may be used to be couple the mounting plate to and decouple the mounting plate from one or more mechanisms of or coupled to the carrier. For example, as shown in FIG. 24, a mounting plate 2470 may include one or more mounting passageways, such as mounting passageways 2471L and 2471R, provided through the body of plate 2470, where such passageways may be used similarly to passageways 71L and 71R for enabling the coupling of plate 2470 to any suitable environment component. Moreover, plate 2470 may include one or more carrier retaining passageways, such as carrier retaining passageways 2470a, 2470b, 2470c, and 2470d, each of which may be used for coupling to any suitable carrier mounting subsystem 20 (e.g., one or more S-clips coupled to the carrier, a bolt or string assembly extending from a carrier, or the like (e.g., a nut/bolt assembly or string or tie or S-clip may extend through a passageway in the carrier (e.g., via a grommet through a side wall or loop on an exterior surface of a side wall) and through a carrier retaining passageway 2470 for coupling the carrier to plate 2470)).

While there have been described carrier mounting systems and methods for using the same, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "left" and "right," "edge" and "corner," "front" and "back," "top" and "bottom" and "side," "above" and "below," "length" and "width" and "thickness" and "diameter" and "cross-section" and "longitudinal," "X-" and "Y-" and "Z-," and/or the like, may be used herein only for convenience, and that no fixed or absolute directional or orientational limitations are intended by the use of these terms. For example, the components of the system can have any desired orientation. If reoriented, different directional or orientational terms may need to be used in their description, but that will not alter their fundamental nature as within the scope and spirit of the subject matter described herein in any way.

Therefore, those skilled in the art will appreciate that the concepts of the disclosure can be practiced by other than the described embodiments, which are presented for purposes of illustration rather than of limitation.

What is claimed is:

1. A system for mounting a carrier to an environment component of an environment, the system comprising:
 a carrier mounting subsystem comprising:
  a carrier mount mechanism; and
  a carrier coupling mechanism for coupling the carrier mount mechanism to the carrier; and
 an environment mounting subsystem comprising:
  an environment mount mechanism; and
  an environment coupling mechanism for coupling the environment mount mechanism to the environment component, wherein:
   the carrier mounting subsystem defines a plurality of loops at least when the carrier mount mechanism is coupled to the carrier;
   the environment mount mechanism comprises a body and a plurality of fingers extending from the body;
   a first finger of the plurality of fingers extends a first length from a first side portion of a first side of the body to a first finger tip;
   a second finger of the plurality of fingers extends a second length from a second side portion of a second side of the body to a second finger tip;
   the first length is longer than the second length;
   the first side of the body and the second side of the body are different sides of the body; and
   the carrier is operative to be coupled to the environment mount mechanism by inserting the first finger into a first loop of the plurality of loops and then by inserting the second finger into a second loop of the plurality of loops while the first finger remains in the first loop.

2. The system of claim 1, wherein a distance between the first side portion of the body and the second finger tip is less than a distance between the first loop and the second loop.

3. The system of claim 1, wherein a distance between the second side portion of the body and the first finger tip is greater than a distance between the first loop and the second loop.

4. The system of claim 1, wherein:
 a distance between the first side portion of the body and the second finger tip is less than a distance between the first loop and the second loop; and
 a distance between the second side portion of the body and the first finger tip is greater than the distance between the first loop and the second loop.

5. The system of claim 1, further comprising a retention mechanism positioned at a retention position along the first finger, wherein a distance between the retention position and the second finger tip is greater than a distance between the first loop and the second loop.

6. The system of claim 5, wherein a distance between the first side portion of the body and the second finger tip is less than the distance between the first loop and the second loop.

7. The system of claim 5, wherein a distance between the second side portion of the body and the first finger tip is greater than the distance between the first loop and the second loop.

8. The system of claim 5, wherein:
 a distance between the first side portion of the body and the second finger tip is less than the distance between the first loop and the second loop; and
 a distance between the second side portion of the body and the first finger tip is greater than the distance between the first loop and the second loop.

9. The system of claim 5, wherein the retention mechanism is operative to prevent movement of the first loop along the first finger towards the first side portion of the body beyond the retention position.

10. A system for mounting a carrier to an environment component of an environment, the system comprising:
 a carrier mounting subsystem comprising:
  a carrier mount mechanism; and
  a carrier coupling mechanism for coupling the carrier mount mechanism to the carrier; and
 an environment mounting subsystem comprising:
  an environment mount mechanism; and
  an environment coupling mechanism for coupling the environment mount mechanism to the environment component, wherein:
   the carrier mounting subsystem defines a plurality of loops at least when the carrier mount mechanism is coupled to the carrier;
   the environment mount mechanism comprises a body and a plurality of fingers extending from the body;
   a first finger of the plurality of fingers extends from a first side portion of a first side of the body to a first finger tip;
   a second finger of the plurality of fingers extends from a second side portion of a second side of the body to a second finger tip;
   the first side of the body and the second side of the body are different sides of the body;
   the carrier is operative to be coupled to the environment mount mechanism by inserting the first finger into a first loop of the plurality of loops and then by inserting the second finger into a second loop of the plurality of loops while the first finger remains in the first loop;

the system further comprises a retention mechanism positioned at a retention position along the first finger;

a distance between the retention position and the second finger tip is greater than a distance between the first loop and the second loop;

the retention mechanism is operative to prevent movement of the first loop along the first finger towards the first side portion of the body beyond the retention position; and the retention mechanism is operative to be coupled to the environment mount mechanism at the retention position once both the first finger is in the first loop and the second finger is in the second loop.

11. A system for mounting a carrier to an environment component of an environment, the system comprising:

a carrier mounting subsystem comprising:
  a carrier mount mechanism; and
  a carrier coupling mechanism for coupling the carrier mount mechanism to the carrier; and an environment mounting subsystem comprising:
  an environment mount mechanism; and
  an environment coupling mechanism for coupling the environment mount mechanism to the environment component, wherein:
    the carrier mounting subsystem defines a plurality of loops at least when the carrier mount mechanism is coupled to the carrier;
    the environment mount mechanism comprises a body and a plurality of fingers extending from the body;
    a first finger of the plurality of fingers extends from a first side portion of a first side of the body to a first finger tip;
    a second finger of the plurality of fingers extends from a second side portion of a second side of the body to a second finger tip;
    the first side of the body and the second side of the body are different sides of the body;
    the carrier is operative to be coupled to the environment mount mechanism by inserting the first finger into a first loop of the plurality of loops and then by inserting the second finger into a second loop of the plurality of loops while the first finger remains in the first loop;
    the system further comprises a retention mechanism positioned at a retention position along the first finger;
    a distance between the retention position and the second finger tip is greater than a distance between the first loop and the second loop;
    the retention mechanism is operative to prevent movement of the first loop along the first finger towards the first side portion of the body beyond the retention position; and
    the retention mechanism is operative to be coupled to the environment mount mechanism via a retention opening through the first finger.

12. The system of claim 1, wherein the first side of the body and the second side of the body are parallel sides of the body.

13. The system of claim 12, wherein:
  a third finger of the plurality of fingers extends from a third side portion of the first side of the body to a third finger tip;
  a fourth finger of the plurality of fingers extends from a fourth side portion of the second side of the body to a fourth finger tip;
  the carrier is operative to be coupled to the environment mount mechanism by inserting the first finger into the first loop and the third finger into a third loop of the plurality of loops and then by inserting the second finger into the second loop and the fourth finger into a fourth loop of the plurality of loops while the first finger remains in the first loop and while the third finger remains in the third loop; and
  the distance between the first side portion of the body and the second finger tip is the same as the distance between the third side portion of the body and the fourth finger tip.

14. The system of claim 1, wherein the first side of the body and the second side of the body are non-parallel sides of the body.

15. The system of claim 14, wherein:
  a third finger of the plurality of fingers extends from a third side portion of the first side of the body to a third finger tip;
  a fourth finger of the plurality of fingers extends from a fourth side portion of the second side of the body to a fourth finger tip;
  the carrier is operative to be coupled to the environment mount mechanism by inserting the first finger into the first loop and the third finger into a third loop of the plurality of loops and then by inserting the second finger into the second loop and the fourth finger into a fourth loop of the plurality of loops while the first finger remains in the first loop and while the third finger remains in the third loop; and
  the distance between the first side portion of the body and the second finger tip is different than the distance between the third side portion of the body and the fourth finger tip.

16. The system of claim 1, wherein the carrier mount mechanism comprises at least one daisy chain webbing strap.

17. The system of claim 1, wherein the carrier mount mechanism comprises two daisy chain webbing straps.

18. A system for mounting a carrier to an environment component of an environment, the system comprising:

a carrier mounting subsystem comprising:
  a carrier mount mechanism; and
  a carrier coupling mechanism for coupling the carrier mount mechanism to the carrier; and an environment mounting subsystem comprising:
  an environment mount mechanism; and
  an environment coupling mechanism for coupling the environment mount mechanism to the environment component, wherein:
    the carrier mounting subsystem defines a plurality of loops at least when the carrier mount mechanism is coupled to the carrier;
    the environment mount mechanism comprises a body and a plurality of fingers extending from the body;
    the carrier is operative to be coupled to the environment mount mechanism by inserting a first finger of the plurality of fingers into a first loop of the plurality of loops and by inserting a second finger of the plurality of fingers into a second loop of the plurality of loops; and the first finger is longer than the second finger.

19. The system of claim 18, wherein:

the environment mounting subsystem further comprises:

another environment mount mechanism that is distinct from the environment mount mechanism; and another environment coupling mechanism for coupling the other environment mount mechanism to the environment component:

the other environment mount mechanism comprises another body and another plurality of fingers extending from the other body; and the carrier is operative to be coupled to the environment mount mechanism by inserting the first finger into the first loop and then by inserting a finger of the other plurality of fingers into a third loop of the plurality of loops while the first finger remains in the first loop.

20. A system for mounting a carrier comprising a plurality of loops to an environment component of an environment, the system comprising:

an environment mount mechanism; and an environment coupling mechanism for coupling the environment mount mechanism to the environment component, wherein:

the environment mount mechanism comprises a body and a plurality of fingers extending from the body;

a first finger of the plurality of fingers extends from a first side portion of a first side of the body to a first finger tip;

a second finger of the plurality of fingers extends from a second side portion of a second side of the body to a second finger tip;

the first side of the body and the second side of the body are different sides of the body;

the carrier is operative to be coupled to the environment mount mechanism by positioning the first finger in a first loop of the plurality of loops and positioning the second finger in a second loop of the plurality of loops; and a distance between the first side portion of the body and the second finger tip is less than a distance between the second side portion of the body and the first finger tip.

* * * * *